United States Patent

(12) United States Patent
Snow

(10) Patent No.: US 10,783,164 B2
(45) Date of Patent: Sep. 22, 2020

(54) IMPORT AND EXPORT IN BLOCKCHAIN ENVIRONMENTS

(71) Applicant: Factom, Austin, TX (US)

(72) Inventor: Paul Snow, Austin, TX (US)

(73) Assignee: Factom, Inc., Austin, TX (US)

(*) Notice: Subject to any disclaimer, the term of this patent is extended or adjusted under 35 U.S.C. 154(b) by 256 days.

(21) Appl. No.: 15/983,612

(22) Filed: May 18, 2018

(65) Prior Publication Data

US 2019/0354611 A1    Nov. 21, 2019

(51) Int. Cl.

| G06F 16/27 | (2019.01) |
| H04L 9/06 | (2006.01) |
| G06F 9/455 | (2018.01) |
| G06Q 20/40 | (2012.01) |
| G06Q 20/06 | (2012.01) |
| G06Q 20/38 | (2012.01) |
| G06F 16/18 | (2019.01) |

(52) U.S. Cl.
CPC .......... *G06F 16/27* (2019.01); *G06F 9/45558* (2013.01); *G06F 16/1805* (2019.01); *G06Q 20/065* (2013.01); *G06Q 20/382* (2013.01); *G06Q 20/401* (2013.01); *H04L 9/0643* (2013.01); *H04L 2209/38* (2013.01); *H04L 2209/56* (2013.01)

(58) Field of Classification Search
CPC .. G06F 16/27; G06F 16/1805; G06F 9/45558; G06F 9/4494; G06F 9/44505; G06F 9/5005; H04L 9/0643; H04L 2209/56; H04L 2209/38; H04L 9/3239; G06Q 20/401; G06Q 20/065; G06Q 20/382
See application file for complete search history.

(56) References Cited

U.S. PATENT DOCUMENTS

| 4,309,569 A | 1/1982 | Merkle |
| 5,499,294 A | 3/1996 | Friedman |
| 5,862,218 A | 1/1999 | Steinberg |

(Continued)

FOREIGN PATENT DOCUMENTS

| DE | 10128728 | 1/2003 |
| JP | 5383297 | 1/2014 |

(Continued)

OTHER PUBLICATIONS

Unkown, "Federated Learning: Collaborative Machine Learning without Centralized Training Data" Apr. 6, 2017, 11 pages.

(Continued)

*Primary Examiner* — Mohammed Waliullah

(74) *Attorney, Agent, or Firm* — Scott P. Zimmerman, PLLC

(57) ABSTRACT

Importation and exportation allows software services in blockchain environments. Blockchains may import data and export data, thus allowing blockchains to offer software services to clients (such as other blockchains). Individual users, businesses, and governments may create their own blockchains and subcontract or outsource operations to other blockchains. Moreover, the software services provided by blockchains may be publically ledgered by still other blockchains, thus providing two-way blockchain interactions and two-way ledgering for improved record keeping.

20 Claims, 29 Drawing Sheets

(56) References Cited

U.S. PATENT DOCUMENTS

| | | | |
|---|---|---|---|
| 5,966,446 | A | 10/1999 | Davis |
| 7,272,179 | B2 | 9/2007 | Siemens et al. |
| 7,572,179 | B2 | 8/2009 | Choi et al. |
| 7,729,950 | B2 | 6/2010 | Mendizabal et al. |
| 8,245,038 | B2 | 8/2012 | Golle et al. |
| 8,266,439 | B2 | 9/2012 | Haber et al. |
| 8,442,903 | B2 | 5/2013 | Zadoorian et al. |
| 8,560,722 | B2 | 10/2013 | Gates et al. |
| 8,706,616 | B1 | 4/2014 | Flynn |
| 8,712,887 | B2 | 4/2014 | DeGroeve et al. |
| 8,867,741 | B2 | 10/2014 | McCorkindale et al. |
| 8,943,332 | B2 | 1/2015 | Horne et al. |
| 9,124,423 | B2 | 9/2015 | Jennas, II et al. |
| 9,396,006 | B2 | 7/2016 | Kundu et al. |
| 9,407,431 | B2 | 8/2016 | Bellare et al. |
| 9,411,524 | B2 | 8/2016 | O'Hare et al. |
| 9,411,976 | B2 | 8/2016 | Irvine |
| 9,411,982 | B1 | 8/2016 | Dippenaar et al. |
| 9,424,576 | B2 | 8/2016 | Vandervort |
| 9,436,935 | B2 | 9/2016 | Hudon |
| 9,472,069 | B2 | 10/2016 | Roskowski |
| 9,489,827 | B2 | 11/2016 | Quinn et al. |
| 9,584,493 | B1 | 2/2017 | Leavy et al. |
| 9,722,790 | B2 | 8/2017 | Ebrahimi |
| 9,876,646 | B2 | 1/2018 | Ebrahimi |
| 9,882,918 | B1 | 1/2018 | Ford et al. |
| 2003/0018563 | A1 | 1/2003 | Kilgour et al. |
| 2004/0085445 | A1 | 5/2004 | Park |
| 2005/0206741 | A1 | 9/2005 | Raber |
| 2006/0075228 | A1 | 4/2006 | Black et al. |
| 2006/0184443 | A1 | 8/2006 | Erez et al. |
| 2007/0094272 | A1 | 4/2007 | Yeh |
| 2007/0296817 | A1 | 12/2007 | Ebrahimi et al. |
| 2008/0010466 | A1 | 1/2008 | Hopper |
| 2009/0025063 | A1 | 1/2009 | Thomas |
| 2009/0287597 | A1 | 11/2009 | Bahar |
| 2010/0049966 | A1 | 2/2010 | Kato |
| 2010/0058476 | A1 | 3/2010 | Isoda |
| 2010/0161459 | A1 | 6/2010 | Kass et al. |
| 2010/0228798 | A1 | 9/2010 | Kodama |
| 2010/0241537 | A1 | 9/2010 | Kass et al. |
| 2013/0142323 | A1 | 6/2013 | Chiarella |
| 2013/0222587 | A1 | 8/2013 | Roskowski |
| 2013/0276058 | A1 | 10/2013 | Buldas |
| 2014/0229738 | A1 | 8/2014 | Sato |
| 2014/0344015 | A1 | 11/2014 | Puertolas-Montasnes et al. |
| 2015/0193633 | A1 | 7/2015 | Chida |
| 2015/0378627 | A1 | 12/2015 | Kitazawa |
| 2016/0071096 | A1 | 3/2016 | Rosca |
| 2016/0119134 | A1 | 4/2016 | Hakoda et al. |
| 2016/0148198 | A1 | 5/2016 | Kelley |
| 2016/0162897 | A1 | 6/2016 | Feeney |
| 2016/0217436 | A1 | 7/2016 | Brama |
| 2016/0253663 | A1 | 9/2016 | Clark et al. |
| 2016/0260091 | A1 | 9/2016 | Tobias |
| 2016/0267472 | A1 | 9/2016 | Lingham et al. |
| 2016/0267558 | A1 | 9/2016 | Bonnell et al. |
| 2016/0275294 | A1 | 9/2016 | Irvine |
| 2016/0283920 | A1 | 9/2016 | Fisher et al. |
| 2016/0292396 | A1 | 10/2016 | Akerwall |
| 2016/0292672 | A1 | 10/2016 | Fay et al. |
| 2016/0292680 | A1 | 10/2016 | Wilson, Jr. et al. |
| 2016/0300200 | A1 | 10/2016 | Brown et al. |
| 2016/0300234 | A1 | 10/2016 | Moss-Pultz et al. |
| 2016/0321675 | A1 | 11/2016 | McCoy et al. |
| 2016/0321751 | A1 | 11/2016 | Creighton, IV et al. |
| 2016/0328791 | A1 | 11/2016 | Parsells et al. |
| 2016/0330031 | A1 | 11/2016 | Drego et al. |
| 2016/0330244 | A1 | 11/2016 | Denton |
| 2016/0337119 | A1 | 11/2016 | Hosaka et al. |
| 2016/0342977 | A1 | 11/2016 | Lam |
| 2016/0342989 | A1 | 11/2016 | Davis |
| 2016/0344737 | A1 | 11/2016 | Anton et al. |
| 2017/0005797 | A1 | 1/2017 | Lanc et al. |
| 2017/0033933 | A1 | 2/2017 | Haber |
| 2017/0053249 | A1 | 2/2017 | Tunnell et al. |
| 2017/0061396 | A1 | 3/2017 | Melika et al. |
| 2017/0124534 | A1 | 5/2017 | Savolainen |
| 2017/0124535 | A1 | 5/2017 | Juels et al. |
| 2017/0177898 | A1 | 6/2017 | Dillenberger |
| 2017/0213287 | A1 | 7/2017 | Bruno |
| 2017/0243208 | A1 | 8/2017 | Kurian et al. |
| 2017/0243289 | A1 | 8/2017 | Rufo |
| 2017/0244757 | A1 | 8/2017 | Castinado et al. |
| 2017/0330279 | A1 | 11/2017 | Ponzone |
| 2017/0352031 | A1 | 12/2017 | Collin |
| 2017/0373859 | A1 | 12/2017 | Shors et al. |
| 2018/0075527 | A1 | 3/2018 | Nagla et al. |
| 2018/0091524 | A1 | 3/2018 | Setty |
| 2018/0097779 | A1 | 4/2018 | Karame et al. |
| 2018/0101701 | A1 | 4/2018 | Barinov |
| 2018/0139042 | A1 | 5/2018 | Binning |
| 2018/0157700 | A1 | 6/2018 | Roberts |
| 2018/0182042 | A1 | 6/2018 | Vinay |
| 2018/0189333 | A1 | 7/2018 | Childress |
| 2018/0219683 | A1 | 8/2018 | Deery |
| 2018/0219685 | A1 | 8/2018 | Deery |
| 2018/0241565 | A1 | 8/2018 | Paolini-Subramanya |
| 2018/0260888 | A1 | 9/2018 | Paolini-Subramanya |
| 2018/0260889 | A1 | 9/2018 | Paolini-Subramanya |
| 2018/0268504 | A1 | 9/2018 | Paolini-Subramanya |
| 2018/0276745 | A1 | 9/2018 | Paolini-Subramanya |
| 2018/0285970 | A1 | 10/2018 | Snow |
| 2018/0316502 | A1 | 11/2018 | Nadeau |
| 2019/0043048 | A1 | 2/2019 | Wright |
| 2019/0044727 | A1 | 2/2019 | Scott |
| 2019/0087446 | A1 * | 3/2019 | Sharma ............... G06Q 20/382 |
| 2019/0205563 | A1 | 7/2019 | Gonzales, Jr. |
| 2019/0268163 | A1 | 8/2019 | Nadeau |
| 2019/0281259 | A1 * | 9/2019 | Palazzolo ............... H04N 5/77 |
| 2019/0324867 | A1 * | 10/2019 | Tang ...................... G06F 9/465 |
| 2019/0334715 | A1 * | 10/2019 | Gray ...................... G06F 21/64 |
| 2019/0354606 | A1 | 11/2019 | Snow |
| 2019/0354607 | A1 | 11/2019 | Snow |
| 2019/0354611 | A1 | 11/2019 | Snow |
| 2019/0354964 | A1 | 11/2019 | Snow |
| 2019/0356733 | A1 | 11/2019 | Snow |
| 2019/0394044 | A1 | 12/2019 | Snow |
| 2019/0394048 | A1 | 12/2019 | Deery |
| 2020/0042635 | A1 | 2/2020 | Douglass |
| 2020/0042982 | A1 | 2/2020 | Snow |
| 2020/0042983 | A1 | 2/2020 | Snow |
| 2020/0042984 | A1 | 2/2020 | Snow |
| 2020/0042985 | A1 | 2/2020 | Snow |
| 2020/0042986 | A1 | 2/2020 | Snow |
| 2020/0042987 | A1 | 2/2020 | Snow |
| 2020/0042988 | A1 | 2/2020 | Snow |
| 2020/0042990 | A1 | 2/2020 | Snow |
| 2020/0042995 | A1 | 2/2020 | Snow et al. |
| 2020/0044827 | A1 | 2/2020 | Snow |
| 2020/0044856 | A1 | 2/2020 | Lynde |
| 2020/0044857 | A1 | 2/2020 | Snow |
| 2020/0089690 | A1 * | 3/2020 | Qiu ....................... H04L 9/3271 |
| 2020/0104712 | A1 * | 4/2020 | Katz .................... G07F 17/329 |

FOREIGN PATENT DOCUMENTS

| | | |
|---|---|---|
| KR | 100653512 | 12/2006 |
| KR | 101747221 | 6/2017 |
| WO | WO 0049797 | 8/2000 |
| WO | WO 2007069 76 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

Casey, "BitBeat: Factom Touts Blockchain Tool for Keeping Record Keepers Honest", Wall Street Journal, Nov. 5, 2014.

Crosby, Michael et al., "BlockChain Technology, Beyond Bitcoin", Sutardja Center for Entrepreneurship & Technology, Berkeley Engineering, Oct. 16, 2015, 35 pages.

(56) References Cited

OTHER PUBLICATIONS

Al-Naji, Nader et al., "Basis: A Price-Stable Cryptocurrency with an Algorithmic Central Bank" www.basis.io Jun. 20, 2017, 27 pages.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Menezes, Alfred. J., et al. "Handbook of Applied Cryptography," 1997, CRC Press, p. 527-28.

Watanabe, Hiroki, et al. "Blockchain contract: Securing a blockchain applied to smart contracts." *2016 IEEE International Conference on Consumer Electronics (ICCE)*. IEEE, 2016.

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

"Midex", https://promo.midex.com/Midex_EN.pdf.

Xtrade White Paper, https://xtrade1-9649.kxcdn.com/wp-content/uploads/2017/09/xtrade-whitepaper.pdf.

Chakravorty, Antorweep, and Chunming Rong. "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

* cited by examiner

IMPORT AND EXPORT IN BLOCKCHAIN ENVIRONMENTS

CROSS-REFERENCE TO RELATED APPLICATIONS

This application relates to U.S. application Ser. No. 15/983,572 filed May 18, 2018, entitled "Private Cryptocoinage in Blockchain Environments", and incorporated herein by reference in its entirety. This application also relates to U.S. application Ser. No. 15/983,595 filed May 18, 2018, entitled "Load Balancing in Blockchain Environments", and incorporated herein by reference in its entirety. This application also relates to U.S. application Ser. No. 15/983,632 filed May 18, 2018, entitled "Personal Blockchain Services", and incorporated herein by reference in its entirety. This application also relates to U.S. application Ser. No. 15/983,655 filed May 18, 2018, entitled "Private Blockchain Services", and incorporated herein by reference in its entirety.

BACKGROUND

Blockchain usage is growing. As cryptographic blockchain gains acceptance, improved techniques are needed to provide greater record keeping.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
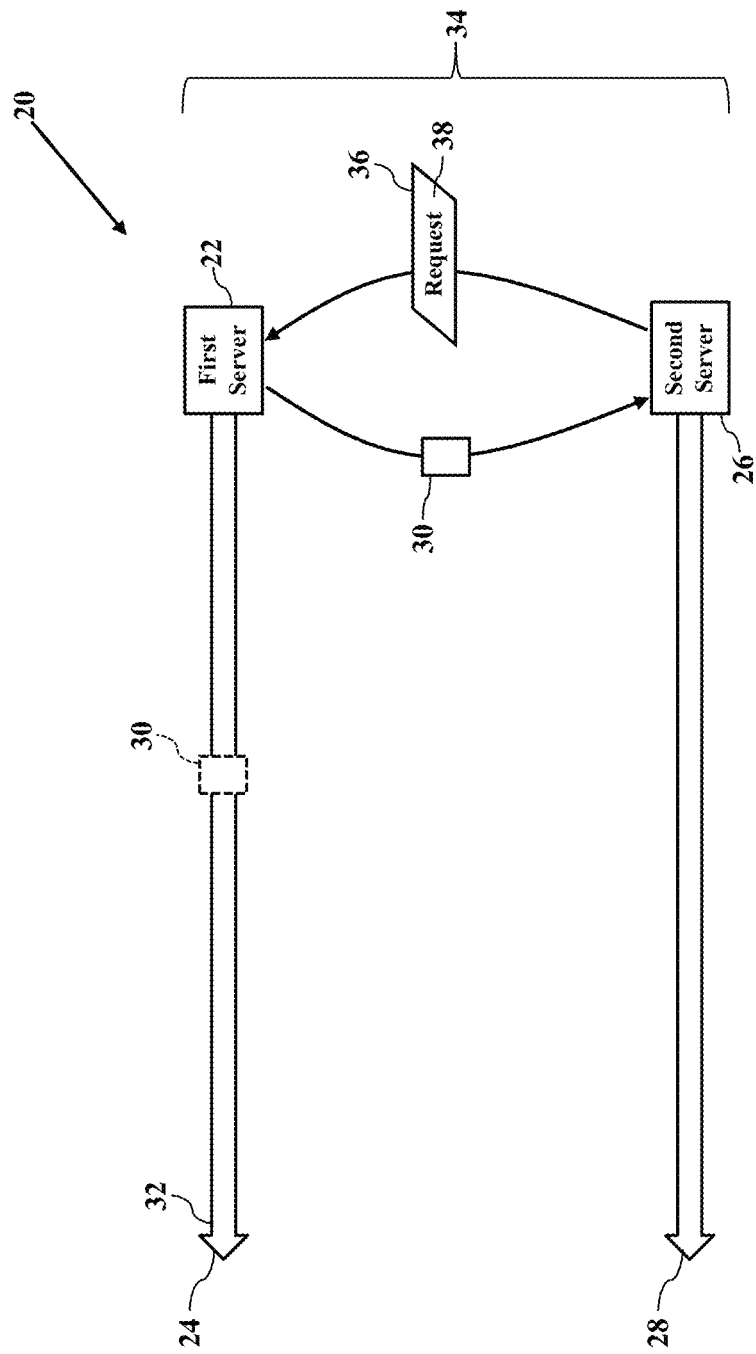
FIGS. 1-8 are simplified illustrations of importation and exportation in a blockchain environment, according to exemplary embodiments.

FIGS. 1-8 are simplified illustrations of importation and exportation in a blockchain environment 20, according to exemplary embodiments. FIG. 1 illustrates a first server 22 generating a first blockchain 24 and a second server 26 generating a second blockchain 28. As the reader may understand, the first blockchain 24 may integrate or chain one or more cryptographically hashed blocks 30 of data, timestamps, and other data. The block 30 of data is enlarged for clarity. The first blockchain 24 may thus be an open, distributed ledger 32 that records transactions for validation and distribution.

Here, though, exemplary embodiments permit an importation 34. That is, exemplary embodiments allow blockchains to import data from other blockchains. FIG. 1 illustrates a simple example in which the single block 30 of data is imported by the second server 26 and/or the second blockchain 28. The second server 26, for example, calls or retrieves the single block 30 of data as an input to the second blockchain 28. The second server 26 may submit a request 36 for importation to the first blockchain 24. The request 32 for importation may include an import specification 38 that specifies inputs, parameters, or other information required of input data (such as an identifier of the single block 30 of data). The first server 22 retrieves the single block 30 of data and sends the single block 30 of data as a response to the second server 26 and/or the second blockchain 28. The second server 26 may then act on the single block 30 of data imported from the first blockchain 24. Moreover, the second server 26 may even apply another layer of cryptographic hashing, thus linking or chaining the single block 30 of data to an entry or block within the second blockchain 28. The second blockchain 28, in other words, confirms or verifies the importation of the single block 30 of data from the first blockchain 24.

Figure 2:
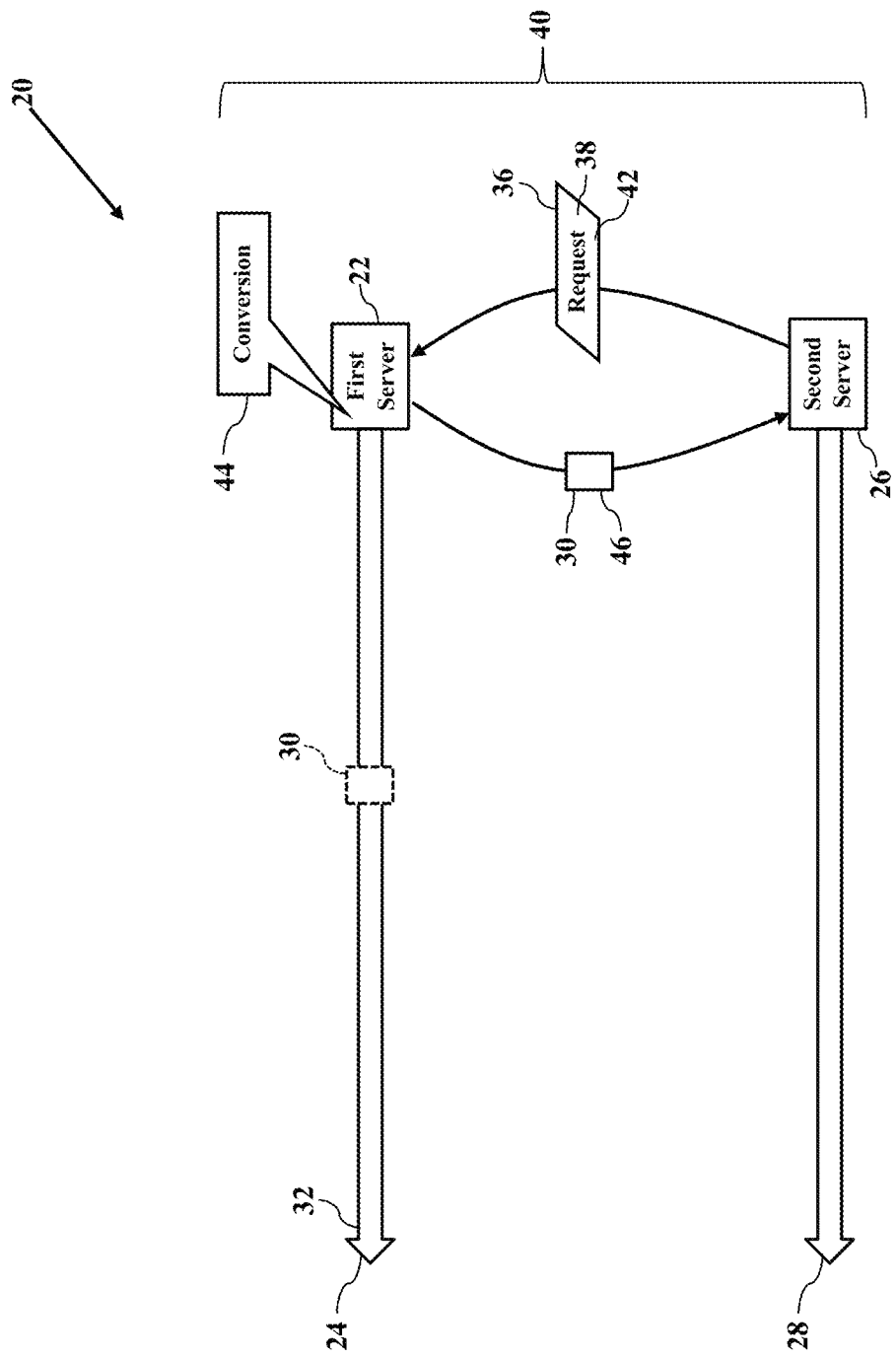

FIG. 2 illustrates an exportation 40. Here exemplary embodiments may convert the single block 30 of data into a different format. When the second server 26 sends the request 36 for importation, the importation specification 38 may specify a format 42 for input data. When the first server 22 retrieves the single block 30 of data, the first server 22 may perform a file or format conversion 44 to satisfy the format 40 specified by the importation specification 38. The first server 22 has thus reformatted or converted the single block 30 of data to comply with the format 42 specified by the importation specification 38. Once the conversion 42 is complete, the first server 22 sends a reformatted version 46 of the single block 30 of data to the second server 26, perhaps as a response to the request 36 for importation. The first server 22 may additionally or alternatively push the reformatted version 46 of the single block 30 of data to the second server 26. Regardless, the second server 26 may then process the reformatted version 46 for any purpose or function. As a simple example, the second server 26 may integrate the reformatted version 46 (imported from the first blockchain 24) into the second blockchain 28. Exemplary embodiments may thus link or chain the reformatted version 46 to the second blockchain 28.

Figure 3:
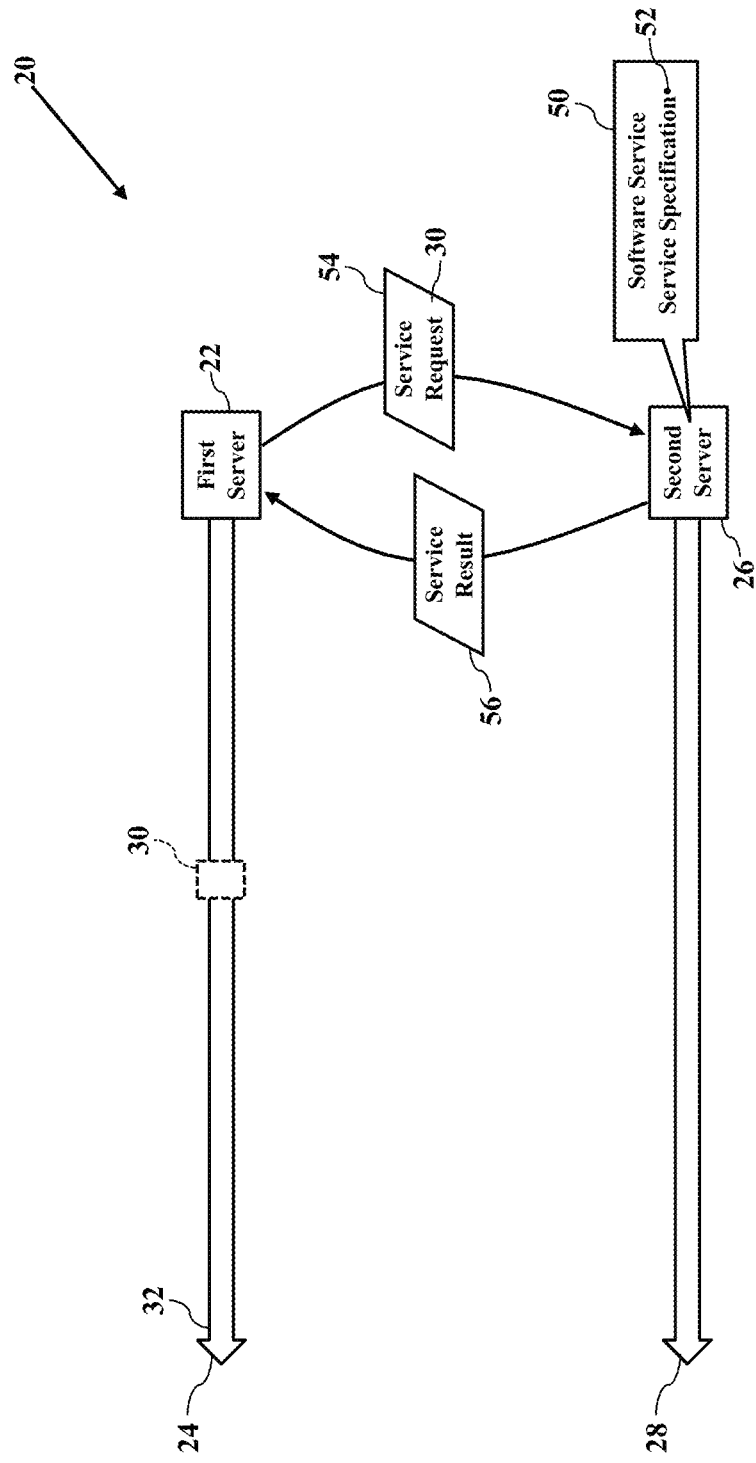

FIG. 3 illustrates functional subcontracting. Here exemplary embodiments may export or outsource any data or information for performance or application of a software function. Suppose, for example, that the second blockchain 28 is associated with a software service 50 performed by the second server 26. The second server 26 and/or the second blockchain 28, in other words, offers or advertises the software service 50 to other blockchains (such as the first blockchain 24 generated by the first server 22). The software service 50 may require that input data satisfy a source specification 52 that specifies inputs, parameters, or other information that is required of input data to perform the software service 50. When the first blockchain 24 requires or desires the software service 50, the first server 22 sends a service request 54 for the service, and the service request 54 may include or specify input data. Again, as a simple example, suppose the first blockchain 24 desires to submit the single block 30 of data to the software service 50. The first server 22 may thus retrieve and send the single block 30 of data to the second server 26. When the second server 26 receives the service request 54, the second server 26 applies the software service 50 to the block 30 of data sent from the first blockchain 24. When the software service 50 is complete, the second server 26 sends a service result 56 back to the first server 22. The service result 56 contains data or information describing an outcome, calculation, or value resulting from the software service 50 applied to the single block 30 of data. The first server 22 may then integrate the service result 56 (perhaps imported from the second blockchain 28) into the first blockchain 24. Again, then, either or both of the first blockchain 24 and the second blockchain 28 document the service result 56 generated by the software service 50.

Figure 4:
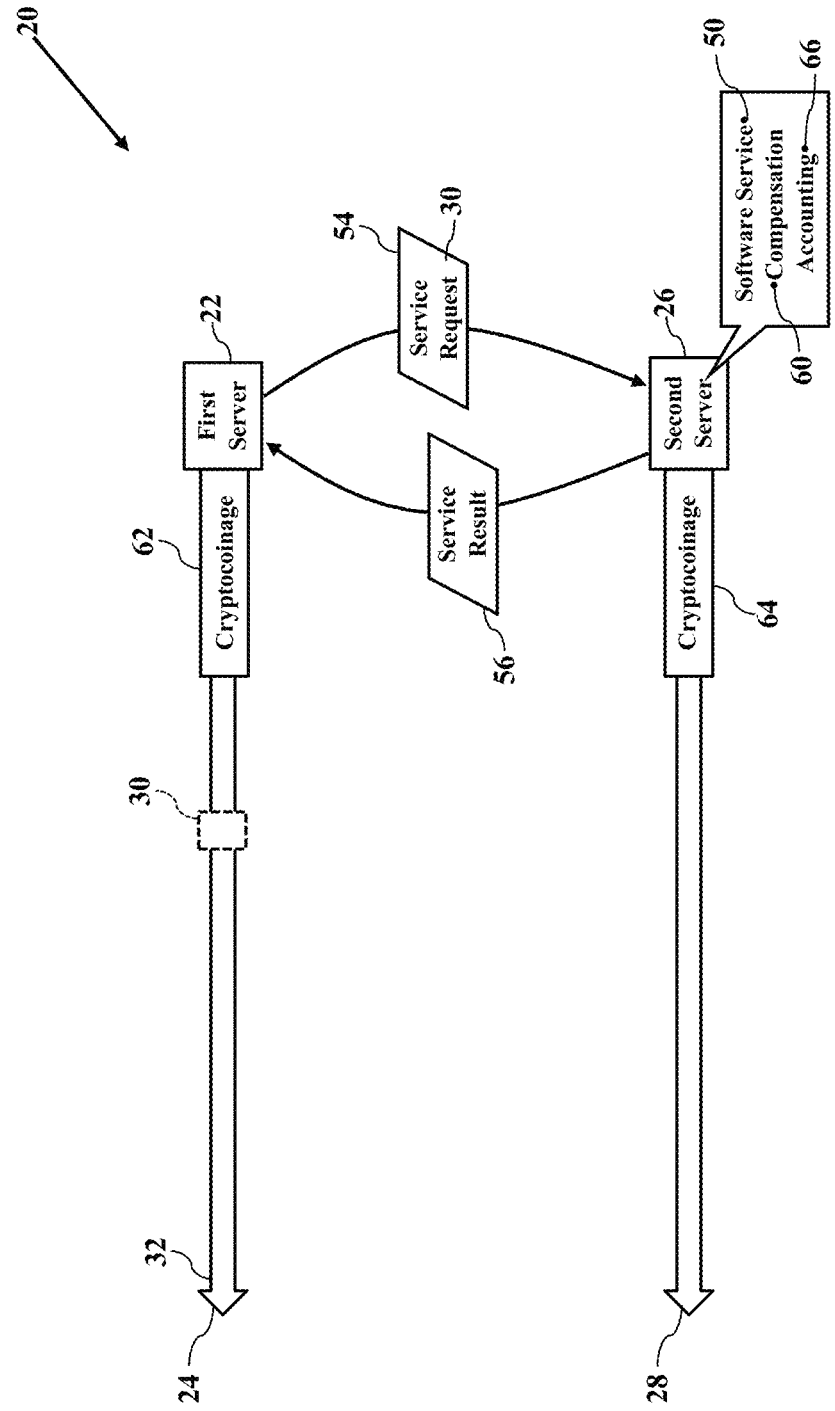

FIG. 4 illustrates a compensation scheme. When the second blockchain 28 provides the software service 50, the second blockchain 28 may be compensated for performing the software service 50. That is, the second server 26 and/or the second blockchain 28 executes the software service 50 in exchange for some kind of compensation 60. While the compensation 60 may be a conventional currency, FIG. 4 illustrates cryptocurrencies (or "cryptocoinage") 62 and 64. That is, the first server 22 and the second server 36 may exchange electronic tokens, coins, or other forms of the cryptocurrencies 62 and 64. The compensation 60 may then be recorded as a transaction or block of data within the first blockchain 24 and/or the second blockchain 28. The first server 22 and/or the second server 26 may thus generate an accounting 66 in response to the service result 56 generated by the second blockchain 28. Moreover, either or both of the first blockchain 24 and the second blockchain 28 may also document the accounting 66 in response to the service result 56.

Figure 5:
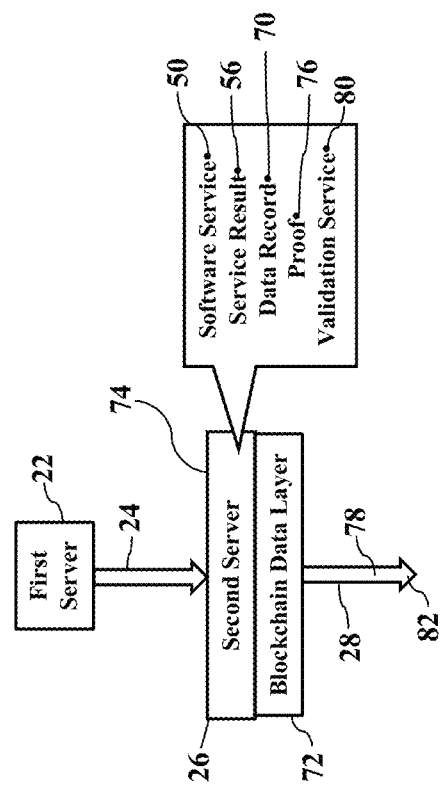

FIG. 5 illustrates public documentation. When the second server 26 provides or performs the software service 50, here exemplary embodiments may publically document the software service 50. As the second server 26 performs the software service 50, the second server 26 may generate one or more data records 70 within a blockchain data layer 72. The second server 26 may thus be called or termed a data layer server 74 that generates the blockchain data layer 72, as later paragraphs will explain. Moreover, the second server 26 may also add another layer of cryptographic hashing to generate one or more cryptographic proofs 76. The cryptographic proofs 76 may then be incorporated into the second blockchain 28. While either or both of the first blockchain 24 and the second blockchain 28 may be private and/or access restricted, here the data layer server 74 may publically publish or distribute the second blockchain 28 (such as via the Internet). The second blockchain 28 may thus be a public blockchain 78 that serves or acts as a validation service 80 for the software service 50 (perhaps described by the data records 70 within the blockchain data layer 72). The public blockchain 78 thus publishes the cryptographic proofs 76 to confirm that the software service 50 was performed. The cryptographic proof 76, in other words, acts as a data anchor 82 in the public blockchain 78 to document the date and time that the software service 50 was executed to generate the service result 56. The public blockchain 78 thus acts as a public ledger that establishes chains of blocks of immutable evidence. Each cryptographic proof 76 thus provides evidentiary documentation of the software service 50.

Figure 6:
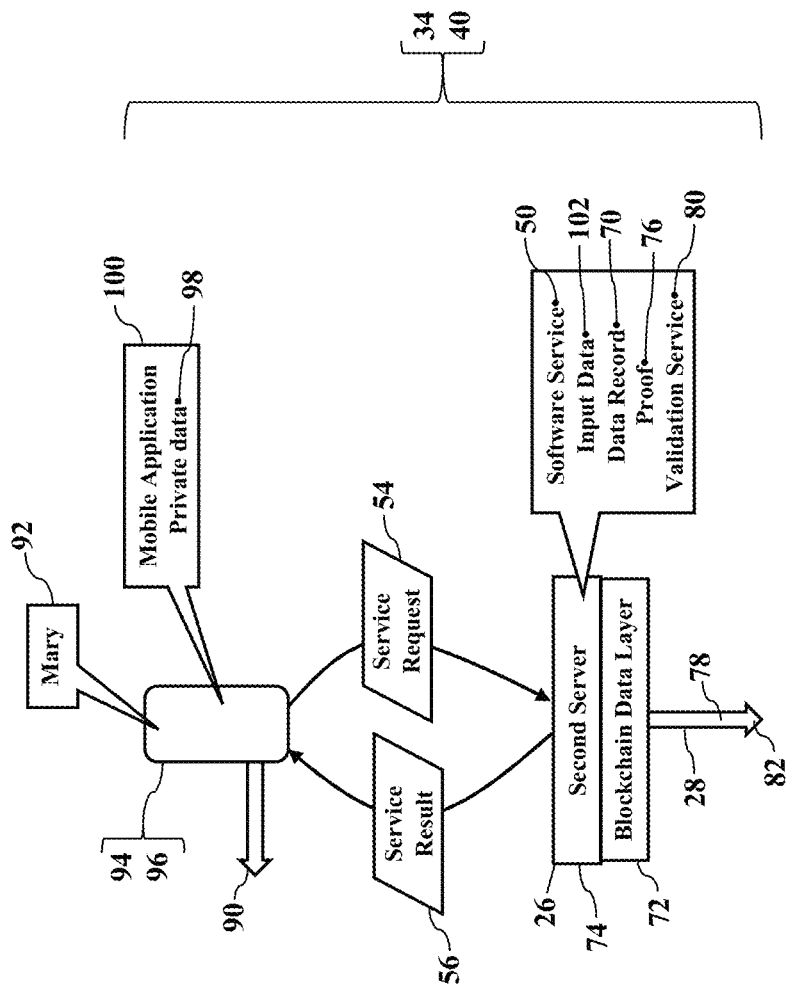

FIG. 6 applies the importation 34 and the exportation 40 to private blockchains. Here exemplary embodiments may be applied to blockchains generated by, or associated with, private entities. While any private entity may create a private blockchain 90, FIG. 6 illustrates a private person or user. For simplicity, suppose a user 92 ("Mary") uses her mobile device 94 (such as her smartphone 96) to generate a personal, private blockchain 90. As the reader likely understands, Mary may use her smartphone 96 for social postings (such as FACEBOOK® and) INSTAGRAM®, for text messaging, for calls, for Internet searches, for banking transactions, and for many other tasks and reasons. Mary's smartphone 96 thus generates much private data 98 reflecting its usage (date/time, location, software application, and key strokes). Mary's smartphone 96 may thus execute a mobile application 100 that encrypts the private data 98 and generates her personal, private blockchain 90. Suppose, then, that her personal blockchain 90 requires the software service 50 provided by the second blockchain 28. Mary's smartphone 96 may thus generate and send the service request 54 to the second server 26 for application or performance of the software service 50. Mary's smartphone 96 may also identify and/or send source or input data 102 associated with the software service 50. The second server 26 applies the source or input data 102 to the software service 50 provided by the second blockchain 28 and sends the service result 56 back to Mary's smartphone 96. Mary's smartphone 96 may then integrate the service result 56 (perhaps imported from the second blockchain 28) into her personal blockchain 90. Moreover, the second server 26 may generate the data records 70 (associated with the blockchain data layer 72) describing the software service 50, add another layer of cryptographic hashing, generate the cryptographic proof 76, and incorporate the cryptographic proof 76 into the public blockchain 78. Again, then, the public blockchain 78 publishes the cryptographic proof 76 as confirmation that the software service 50 was performed. The cryptographic proof 76 again acts as the anchor 82 to document immutable evidence of the software service 50. Mary may also compensate the data layer server 74 and/or the public blockchain 78 for documenting the software service 50.

Figure 7:
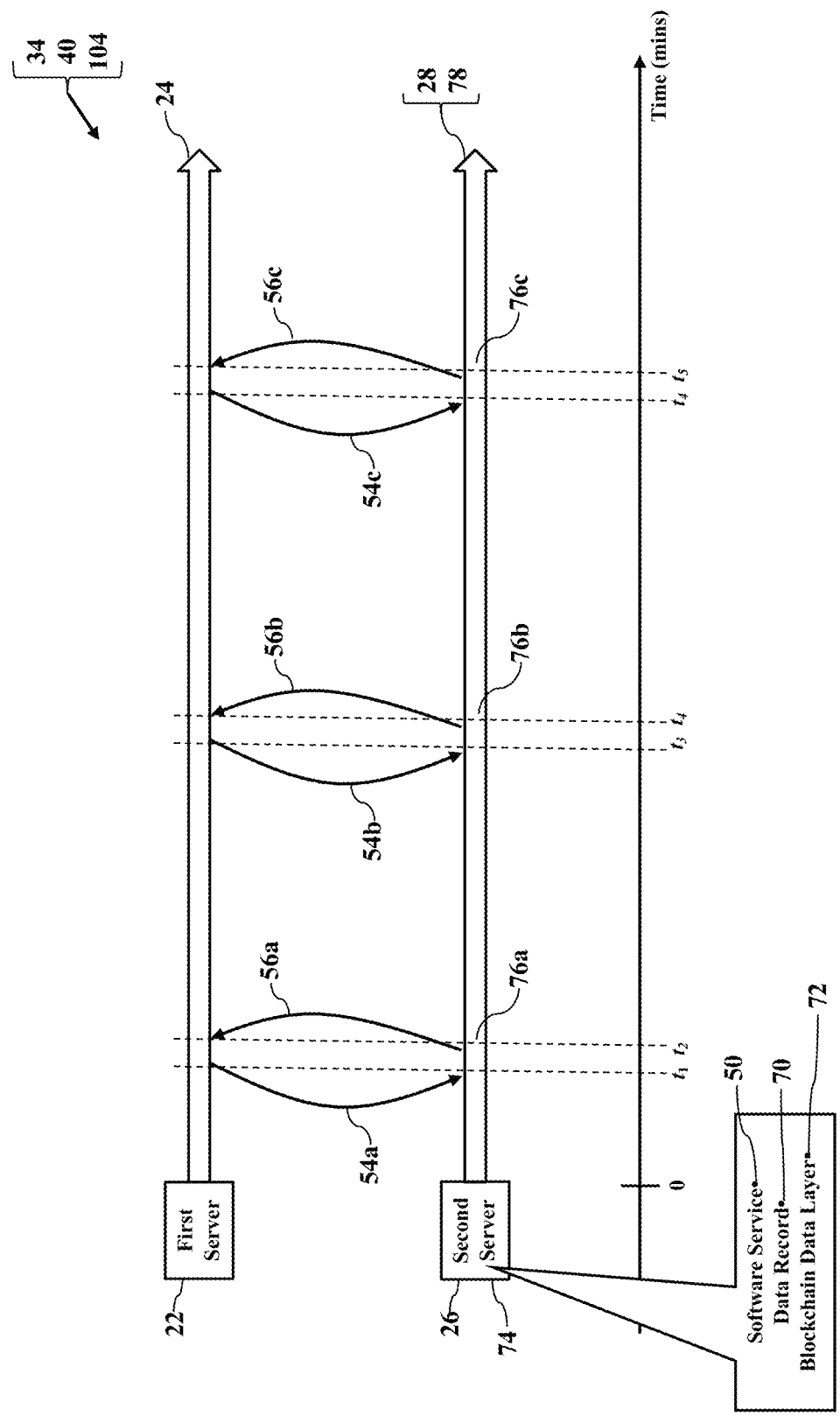

FIG. 7 illustrates nesting over time. As the first server 22 generates the first blockchain 24, multiple times the software service 50 may desired. FIG. 7 thus illustrates a timeline 104 of interactions between the first blockchain 24 and the second blockchain 28. As the first blockchain 24 propagates in time, there may be many instances in which the software service 50 is requested. FIG. 7 thus illustrates a simple example in which at approximately time $t_1$ (perhaps from an initial time 0) the first blockchain 24 sends the service request 54a. The second blockchain 28 executes the software service 50 and at approximately time $t_2$ the service result 56a is sent to the first blockchain 24. The second server 22, acting as the data layer server 74, may then generate the data records 70 of the blockchain data layer 72 that document the service result 56a. Moreover, the second server 22 may publically publish the cryptographic proof 76a within the public blockchain 78, thus further documenting immutable evidence of the service result 56a.

The software service 50 may be repeatedly called. Each time the first blockchain 24 requires the software service 50, the first blockchain 24 may invoke the service mechanism. For example, suppose at approximately time $t_3$ the first blockchain 24 again sends the service request 54b for a second application or performance of the software service 50. At approximately time $t_4$ the service result 56b is generated and sent back to the first blockchain 24. Exemplary embodiments may then generate the data records 70 of the blockchain data layer 72 that document the service result 56b and/or publically publish the cryptographic proof 76b within the public blockchain 78, again documenting immutable evidence of the service result 56b. Later, at approximately time $t_5$, the first blockchain 24 may again send the service request 54c for a third application or performance of the software service 50. At approximately time $t_6$ the service result 56c is generated and sent back to the first blockchain 24, data records 70 are generated, and the cryptographic proof 76c may be publically published within the public blockchain 78 to document the service result 56c. Moreover, the first server 22 may also generate blocks of data within the first blockchain 24 that additionally document each service request 54a-c and each service result 56a-c. The first blockchain 24 and the second blockchain 28 may thus contain blocks of data that link, relate, or intertwine blocks of data documenting each invocation of the software service 50.

Figure 8:
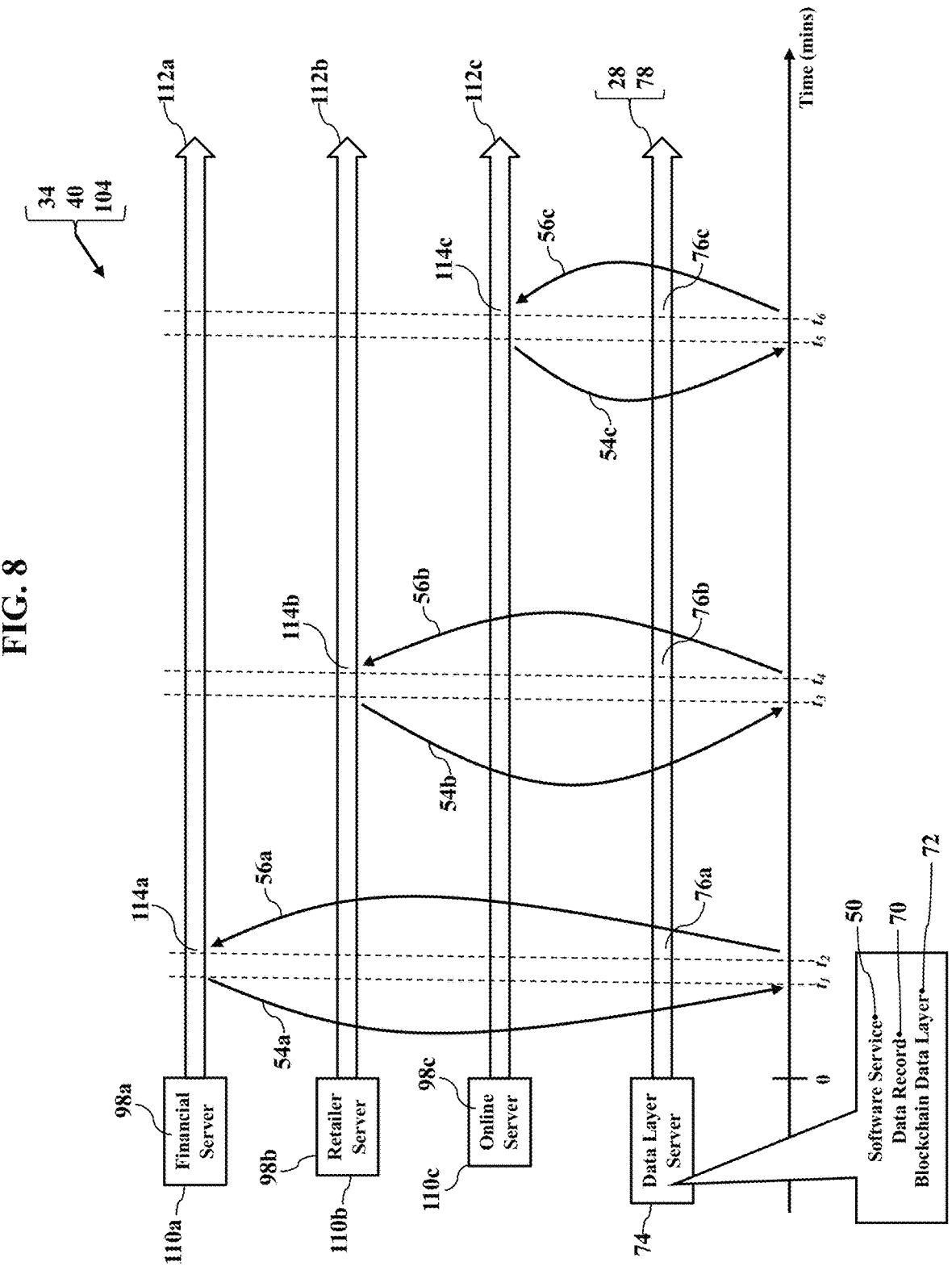

FIG. 8 further illustrates nesting of blockchains over time. As more and more businesses implement blockchain technology into their record keeping activities, vendors and suppliers will offer blockchains that specialize in different software services 50. Moreover, other blockchains will compete to offer the same or similar software services 50. FIG. 8 thus further applies the importation 34, the exportation 40, and/or the software service 50 in a supplier or subcontractor environment. That is, the software service 50 may be applied to any entity, perhaps in a subscription or other compensation scheme. Suppose, for example, that a financial server 110a is operated on behalf of a bank, lender, or other financial institution (such as PIMCO®, CITI®, or BANK OF AMERICA®). As the reader likely understands, the financial institution creates a massive amount of banking records, transaction records, mortgage instruments, and other private data 98a. The financial server 110a executes a software application (not shown for simplicity) that hashes its private data 98a and generates its private blockchain 112a. When the financial server 110a and/or the private blockchain 112a require the software service 50, at approximately time $t_1$ the service request 54a is sent and at approximately time $t_2$ the service result 56a is sent to the financial server 110a and/or the private blockchain 112a. The data layer server 74 may then generate the data records 70 of the blockchain data layer 72 that document the service result 56a. Moreover, the second server 22 may publically publish the cryptographic proof 76a within the public blockchain 78, thus further documenting immutable evidence of the service result 56a. The financial server 110a may also generate blocks of data 114a within the private blockchain 112a that also document the service request 54a and the service result 56a.

The software service 50 may be offered to other entities. Suppose that a retailer (such as HOME DEPOT®, KOHL'S®, or WALMART®) operates a retailer server 110b that hashes its private data 98b and generates its private blockchain 112b. When the retailer server 110b and/or the private blockchain 112b require the software service 50, at approximately time $t_3$ the service request 54b is sent and at approximately time $t_4$ the service result 56b is sent back to the retailer server 110b and/or the private blockchain 112b. The data layer server 74 may generate the data records 70 that document the service result 56b, and the cryptographic proof 76b may be published within the public blockchain 78. The retailer server 110b may also generate blocks of data 114b within the private blockchain 112b that also document the service request 54b and the service result 56b. Similarly, an online server 110c offering an online service (such as AMAZON®, NETFLIX®, or GOOGLE®) hashes its private data 98c and generates its private blockchain 112c. When the online server 110c and/or the private blockchain 112c require the software service 50, at approximately time $t_5$ the service request 54c is sent and at approximately time $t_6$ the service result 56c is sent back to the online server 110c and/or the private blockchain 112c. The data layer server 74 may generate the data records 70 that document the service request 54c and/or the service result 56c, and the cryptographic proof 76c may be published within the public blockchain 78. The online server 110c may also generate blocks of data 114c within the private blockchain 112c that also document the service request 55c and the service result 56c.

Exemplary embodiments thus describe elegant solutions. Blockchains may import data and export data in desired formats. Blockchains may offer and advertise software services 50, and blockchains may specialize in different software services and/or functions that perform or accomplish particular tasks. A marketplace may thus develop for vendors of different software services 50, perhaps accessible using a vendor-specific or service-specific software application that is downloaded or accessed via a web interface. Moreover, exemplary embodiments allow individual users and other private entities to create their own private blockchains using their private data 98 and restrict its distribution, if desired. Cryptographic publication provides a public witness via the anchor(s) 82 to the public blockchain 78. Exemplary embodiments thus provide importation and exportation schemes for hybrid two-way blockchain interactions and two-way ledgering for improved record keeping.

Figure 9:
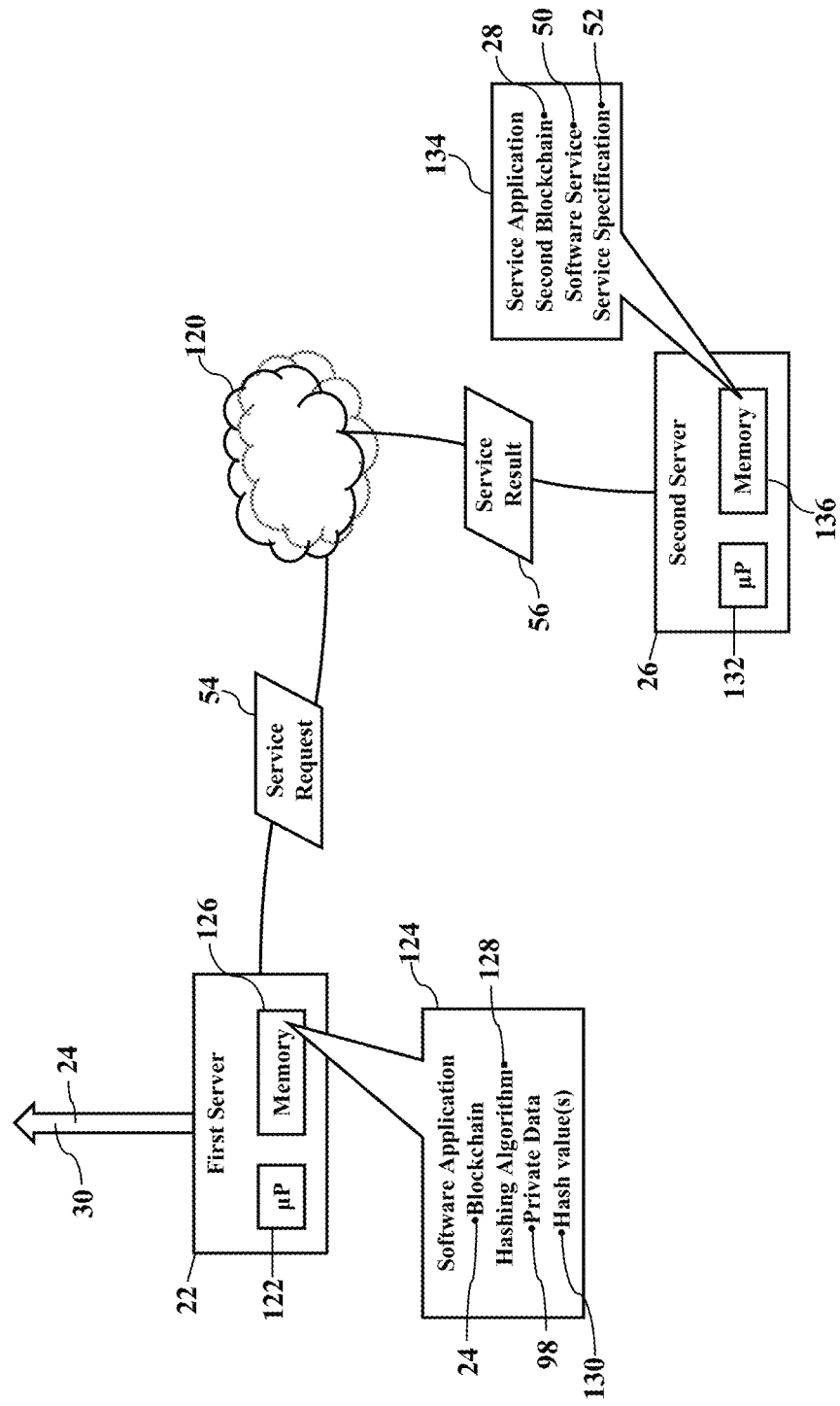
FIGS. 9-12 are more detailed illustrations of an operating environment, according to exemplary embodiments.

FIGS. 9-12 are more detailed illustrations of an operating environment, according to exemplary embodiments. FIG. 9 illustrates the first server 22 communicating with the second server 26 via a communications network 120. The first server 22 operates on behalf of any entity (such as the private user 92 illustrated in FIG. 6 or the entity servers 110*a-c* illustrated in FIG. 7). Whatever the entity, the first server 22 generates the first blockchain 24. The first server 22, in other words, has a processor 122 (e.g., "µP"), application specific integrated circuit (ASIC), or other component that executes a software application 124 stored in a local memory device 126. The first server 22 has a network interface to the communications network 120, thus allowing two-way, bidirectional communication with the second server 26. The entity's software application 124 includes instructions, code, and/or programs that cause the first server 22 to perform operations, such as calling, invoking, and/or applying an electronic representation of a hashing algorithm 128 to the entity's private data 98. The hashing algorithm 128 thus generates one or more hash values 130, which may be incorporated into the blocks 30 of data within the first blockchain 24.

The software service 50 may be required. When the first server 22 and/or the entity's blockchain 24 needs the software service 50, the software application 124 instructs the first server 22 to generate and send the service request 54 via the communications network 120 to any network address (such as an Internet protocol address) associated with the software service 50. Suppose, for example, that the software service 50 is executed by the second server 26. The second server 26 has a processor 132 (e.g., "µP"), application specific integrated circuit (ASIC), or other component that executes a service application 134 stored in a local memory device 136. The second server 26 has a network interface to the communications network 120. The service application 134 includes instructions, code, and/or programs that cause the second server 26 to perform operations, such as receiving the service request 54, generating the service result 56, and generating the second blockchain 28. The service application 134 may then call or invoke the network interface and send the service result 56 via the communications network 120 to the network address (such as an Internet protocol address) associated with the first server 22 and/or the entity's blockchain 24.

Figure 10:
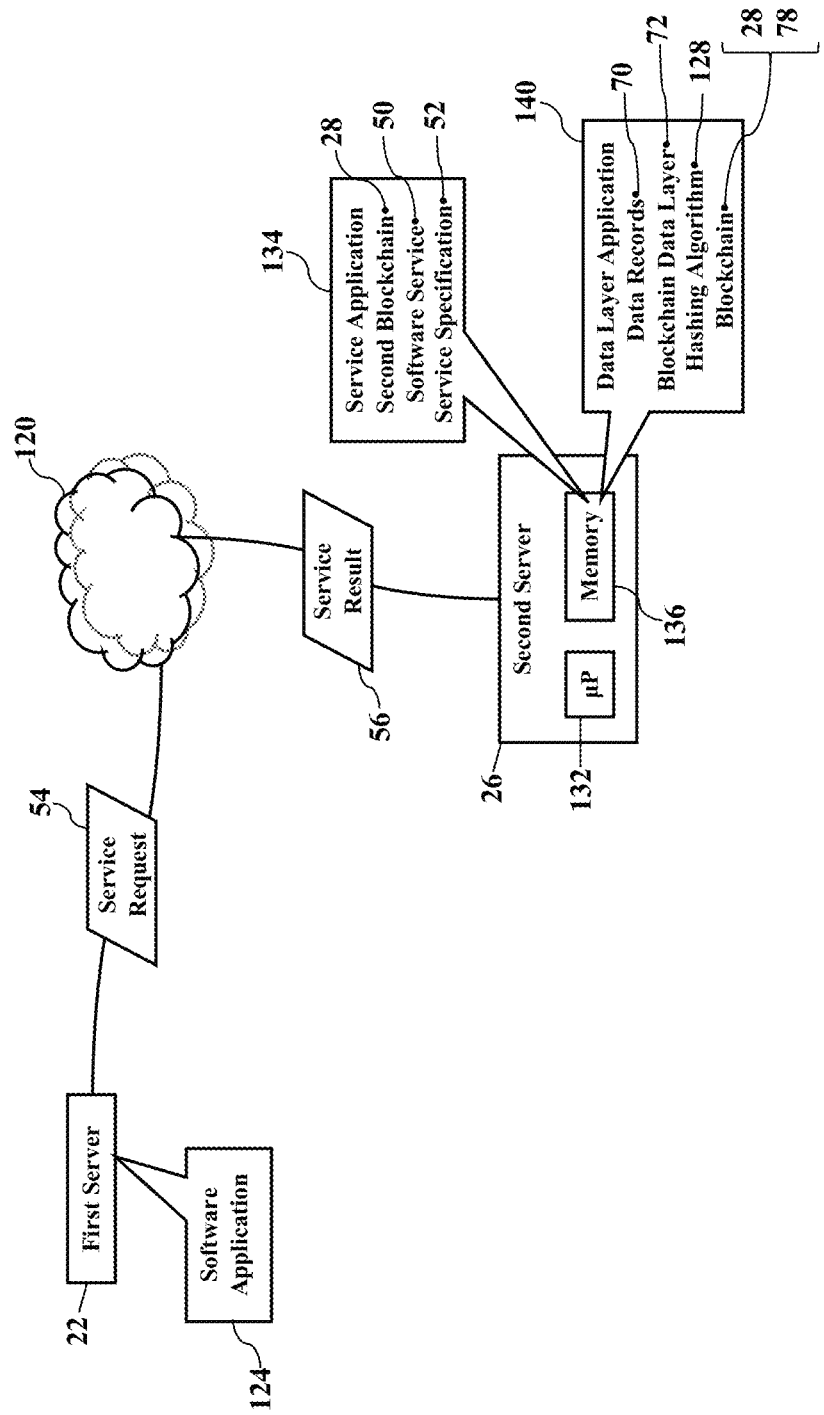

FIG. 10 illustrates the blockchain data layer 72. Here second server 26 may additionally generate the blockchain data layer 72, thus perhaps simultaneously functioning as the data layer server 74. Exemplary embodiments may thus combine or co-locate the software service 50 and the blockchain data layer 72 for improved servicing and record keeping. The service application 134 may thus call, invoke, or cooperate with a data layer application 140 (perhaps as a software module). The data layer application 140 includes instructions, code, and/or programs that cause the processor 132 to perform operations, such as creating the data records 70 associated with the blockchain data layer 72. The data records 70 may comprise data or information representing the service request 54, service result 56, and/or their corresponding hash values 130. Moreover, the data layer application 140 may itself call, invoke, and/or apply the electronic representation of the hashing algorithm 128 to the data records 70, which may be incorporated into the public or private blockchain 28 and 78.

Figure 11:
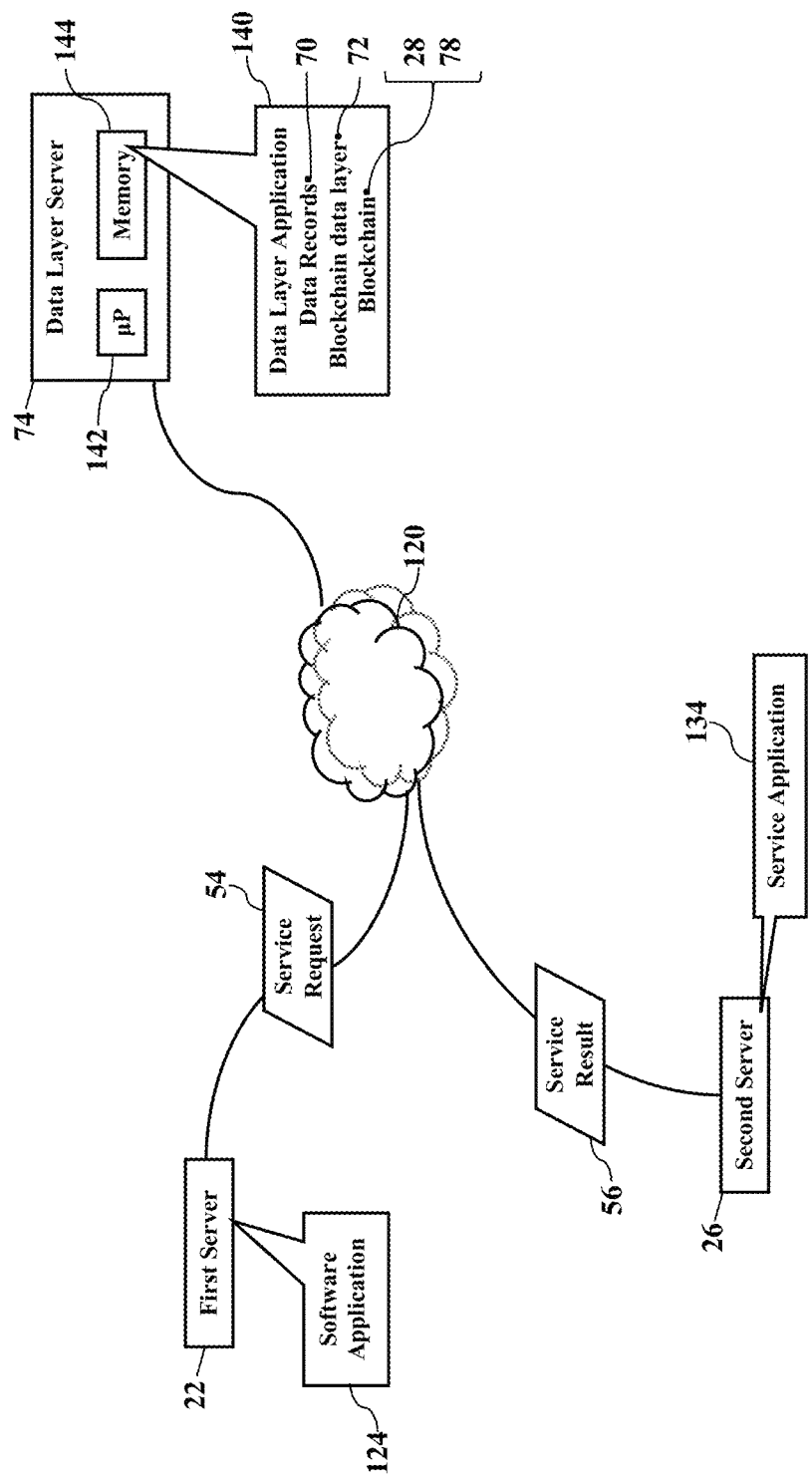

FIG. 11 further illustrates the blockchain data layer 72. Here the data layer server 74 may be a separate network element or component that generates the blockchain data layer 72. For example, when the first server 22 requests the software service 50, the software application 124 may instruct the first server 22 to copy and send the service request 54 via the communications network 120 to the network address (such as an Internet protocol address) associated with the data layer server 74. The second server 26 may additionally or alternatively copy and send the service request 54 to the data layer server 74. When the service application 134 generates the service result 56, the second server 26 may copy and send the service result 56 to the data layer server 74. The first server 22 may additionally or alternatively copy and send the service result 56 to the data layer server 74. Regardless, the data layer server 74 has a processor 142 (e.g., "µP"), application specific integrated circuit (ASIC), or other component that executes the data layer application 140 stored in a local memory device 144. The data layer server 74 has a network interface to the communications network 120. The data layer application 140 includes instructions, code, and/or programs that cause the data layer server 74 to perform operations, such as creating the data records 70 associated with the blockchain data layer 72. The data records 70 may comprise data or information representing the service request 54, service result 56, and/or their corresponding hash values 130. Moreover, the data layer application 140 may itself call, invoke, and/or apply the electronic representation of the hashing algorithm 128 to the data records 70, which may be incorporated into the public or private blockchain 28 and 78.

Exemplary embodiments may thus cooperate in a client/server fashion. The first server 22, the second server 26, and/or the data layer server 74 may cooperate to send, receive, and/or generate the service request 54, the service result 56, and/or the data records 70 associated with the blockchain data layer 72. The software application 124, the service application 134, and/or the data layer application 140 may likewise cooperate to send, receive, and/or generate the service request 54, the service result 56, and/or the data records 70 associated with the blockchain data layer 72. Indeed, the mobile application 100 (illustrated in FIG. 6) may also cooperate to send, receive, and/or generate the service request 54, the service result 56, and/or the data records 70 associated with the blockchain data layer 72.

Figure 12:
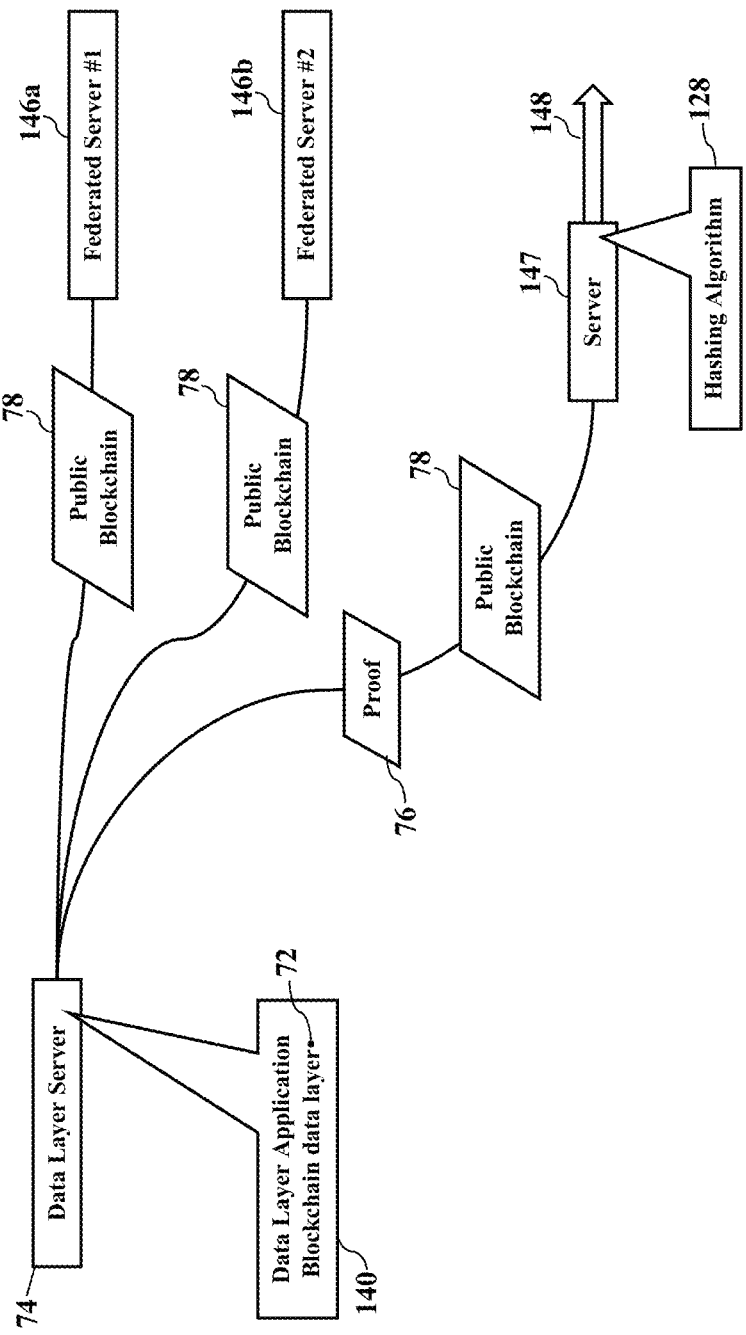
Figure 13:
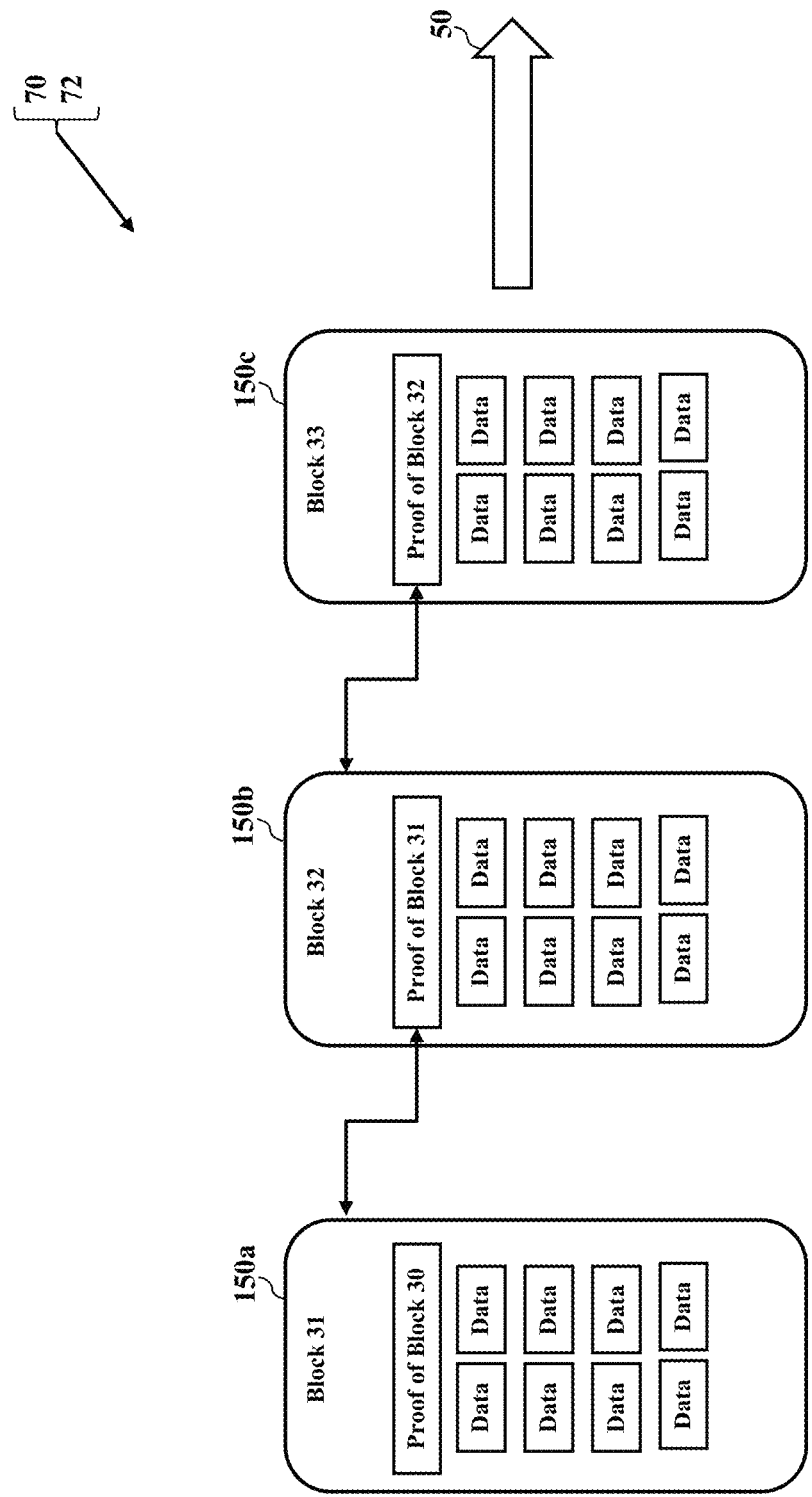
FIGS. 13-17 illustrate a blockchain data layer, according to exemplary embodiments.

FIG. 12 illustrates additional publication mechanisms. Once the blockchain data layer 72 is generated, the blockchain data layer 72 may be published in a decentralized manner to any destination. The data layer server 74, for example, may generate and distribute the public blockchain 78 (via the communications network 120 illustrated in FIGS. 9-11) to one or more federated servers 146. While there may be many federated servers 146, for simplicity FIG. 12 only illustrates two (2) federated servers 146*a* and 146*b*. The federated servers 146*a* and 146*b* provide a service and, in return, they are compensated according to a compensation or services agreement or scheme.

Exemplary embodiments include still more publication mechanisms. For example, the cryptographic proof 76 and/or the public blockchain 78 may be sent (via the communications network 120 illustrated in FIGS. 9-11) to a server 147. The server 147 may then add another, third layer of cryptographic hashing (perhaps using the hashing algorithm 128) and generate another or second public blockchain 148. While the server 147 and/or the public blockchain 148 may be operated by, or generated for, any entity, exemplary embodiments may integrate another cryptographic coin mechanism. That is, the server 147 and/or the public blockchain 148 may be associated with BITCOIN®, ETHEREUM®, RIPPLE®, or other cryptographic coin mechanism. The cryptographic proof 76 and/or the public blockchain 148 may be publically distributed and/or documented as evidentiary validation. The cryptographic proof 76 and/or the public blockchain 148 may thus be historically and publically anchored for public inspection and review.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 120, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

FIGS. 13-17 further illustrate the blockchain data layer 72, according to exemplary embodiments. The blockchain data layer 72 chains hashed directory blocks 150 of data into the public blockchain 78. For example, the blockchain data layer 72 accepts input data (such as the service request 54 illustrated in FIGS. 3-11) within a window of time. While the window of time may be configurable from fractions of seconds to hours, exemplary embodiments use ten (10) minute intervals. FIG. 12 illustrates a simple example of only three (3) directory blocks 150*a-c* of data, but in practice there may be millions or billions of different blocks. Each directory block 150 of data is linked to the preceding blocks in front and the following or trailing blocks behind. The links are created by hashing all the data within a single directory block 150 and then publishing that hash value within the next directory block.

Figure 14:
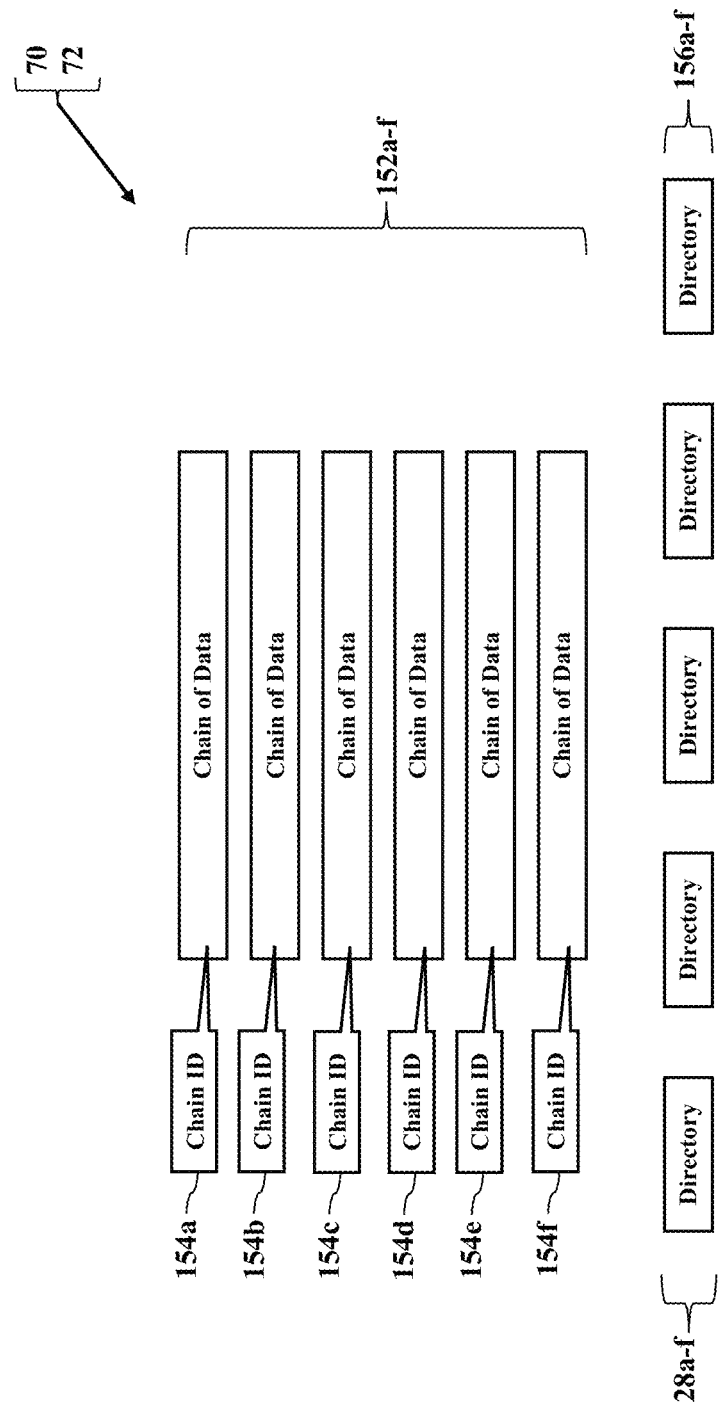

As FIG. 14 illustrates, published data may be organized within chains 152. Each chain 152 is created with an entry that associates a corresponding chain identifier 154. Each entity's blockchain, in other words, may have its corresponding chain identifier 154*a-d*. The blockchain data layer 72 may thus track any data associated with the entity with its corresponding chain identifier 154*a-d*. New and old data in time may be associated with, linked to, identified by, and/or retrieved using the chain identifier 154*a-d*. Each chain identifier 154*a-d* thus functionally resembles a directory 156*a-d* (e.g., files and folders) for organized data entries according to the entity.

Figure 15:
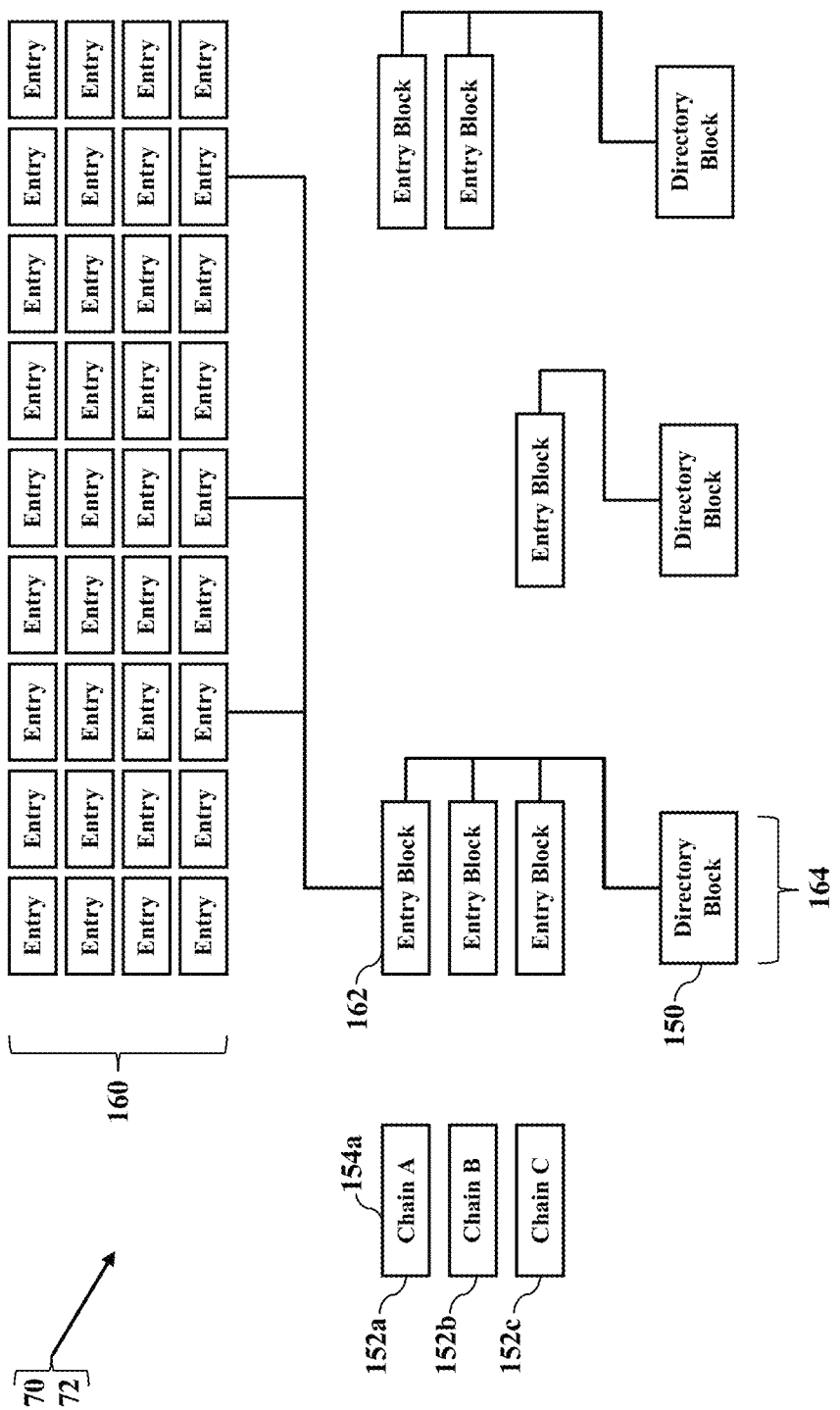

FIG. 15 illustrates the data records 70 in the blockchain data layer 72. As data is received as an input (such as the blockchain(s) 24, 28, 78, 90, and/or 112 illustrated in FIGS. 1-8), data is recorded within the blockchain data layer 72 as an entry 160. While the data may have any size, small chunks (such as 10 KB) may be pieced together to create larger file sizes. One or more of the entries 160 may be arranged into entry blocks 162 representing each chain 152 according to the corresponding chain identifier 154. New entries for each chain 152 are added to their respective entry block 162 (again perhaps according to the corresponding chain identifier 154). After the entries 160 have been made within the proper entry blocks 162, all the entry blocks 162 are then placed within in the directory block 150 generated within or occurring within a window 164 of time. While the window 164 of time may be chosen within any range from seconds to hours, exemplary embodiments may use ten (10) minute intervals. That is, all the entry blocks 162 generated every ten minutes are placed within in the directory block 150.

Figure 16:
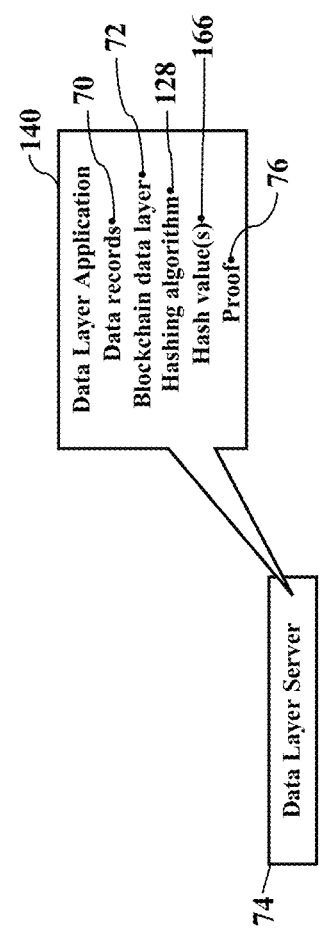

FIG. 16 illustrates cryptographic hashing. The data layer server 74 executes the data layer application 140 to generate the data records 70 in the blockchain data layer 72. The data layer application 140 may then instruct or cause the data layer server 74 to execute the hashing algorithm 128 on the data records 70 (such as the directory block 150 explained with reference to FIGS. 13-15). The hashing algorithm 128 thus generates one or more hash values 166 as a result, and the hash values 166 represent the hashed data records 70. As one example, the blockchain data layer 72 may apply a Merkle tree analysis to generate a Merkle root (representing a Merkle proof 76) representing each directory block 150. The blockchain data layer 72 may then publish the Merkle proof 76 (as this disclosure explains).

Figure 17:
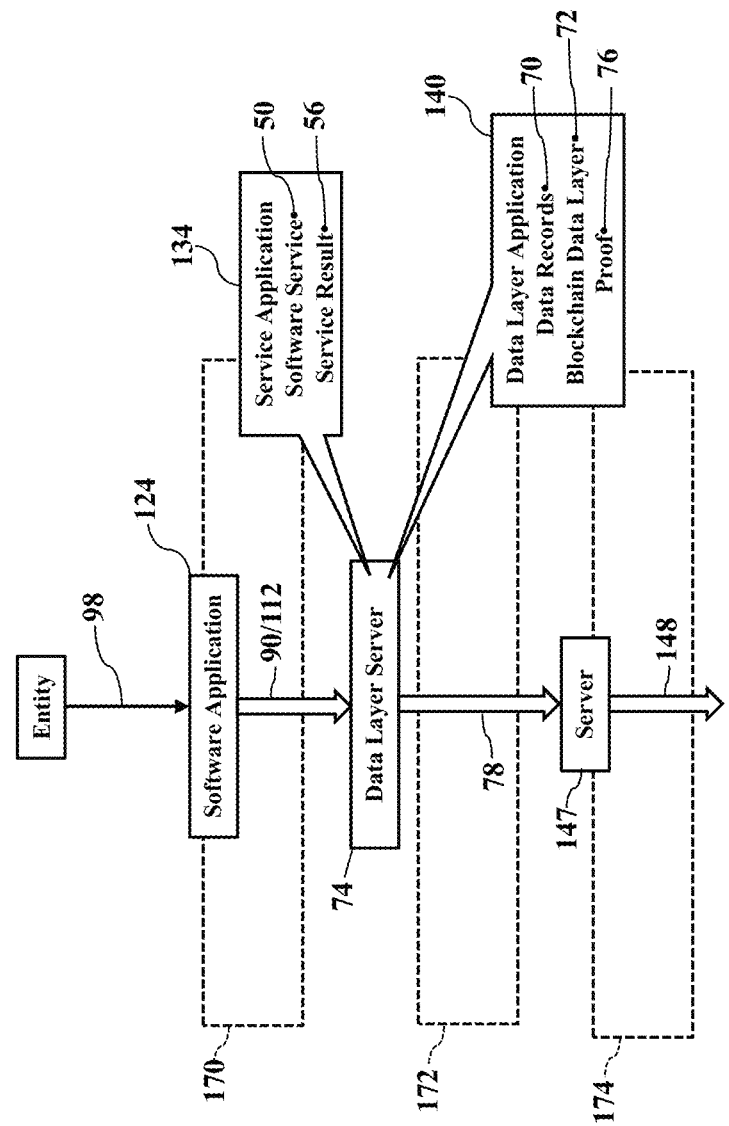

FIG. 17 illustrates hierarchical hashing. Any entity may use its software application 124 to hash its private data 98 to provide a first layer 170 of cryptographic hashing and generates the private blockchain 90/112. Any blocks of data within the private blockchain 90/112 may be sent to a destination associated with the software service 50 (such as the data layer server 74). The data layer server 74 may thus execute the service application 134 to provide the service result 56. The data layer server 74 may also execute the data layer application 140 and generate the data records 70 in the blockchain data layer 72. The data layer application 140 may optionally provide a second or intermediate layer 172 of cryptographic hashing to generate the cryptographic proof 76. The data layer application 140 may also publish any of the data records 70 as the public blockchain 78, and the cryptographic proof 76 may or may not also be published via the public blockchain 78. The public blockchain 78 and/or the cryptographic proof 76 may be optionally sent to the server 147 as an input to yet another public blockchain 148 (again, such as BITCOIN®, ETHEREUM®, or RIPPLE®) for a third layer 174 of cryptographic hashing and public publication. The first layer 170 and the second layer 172 thus ride or sit atop a conventional public blockchain 148 (again, such as BITCOIN®, ETHEREUM®, or RIPPLE®) and provide additional public and/or private cryptographic proofs 76.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Exemplary embodiments may use any call mechanism. The service request 54, for example, may specify or define the software service 50 as a function, order, or subroutine name, perhaps along with formal parameters (perhaps as an application programming interface or API). The service request 54 may additionally or alternatively be a software or language code construct (such as a JAVA® class and/or language key).

Figure 18:
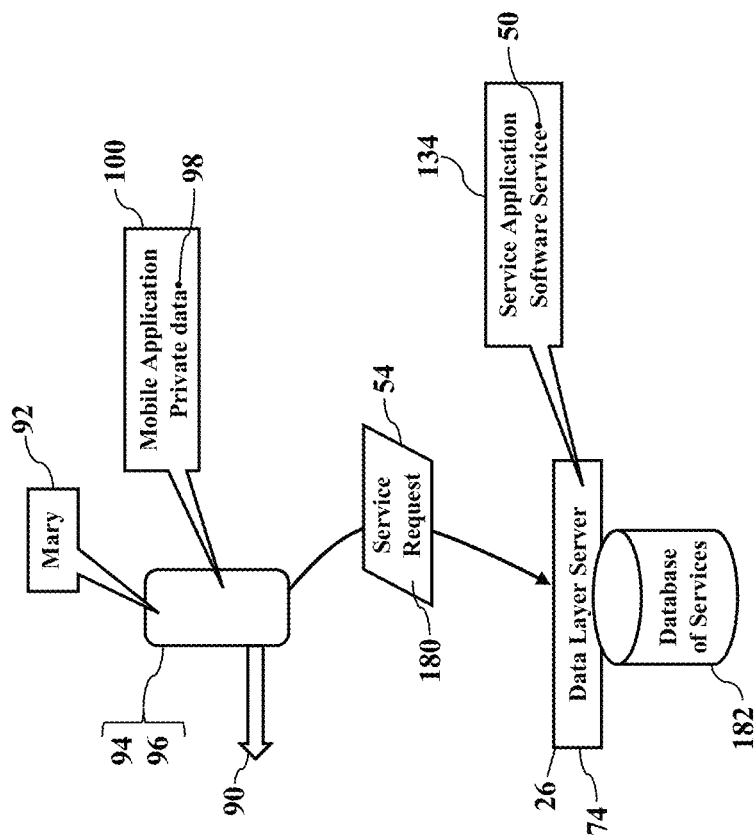
FIGS. 18-19 illustrate a service warehouse, according to exemplary embodiments.
Figure 19:
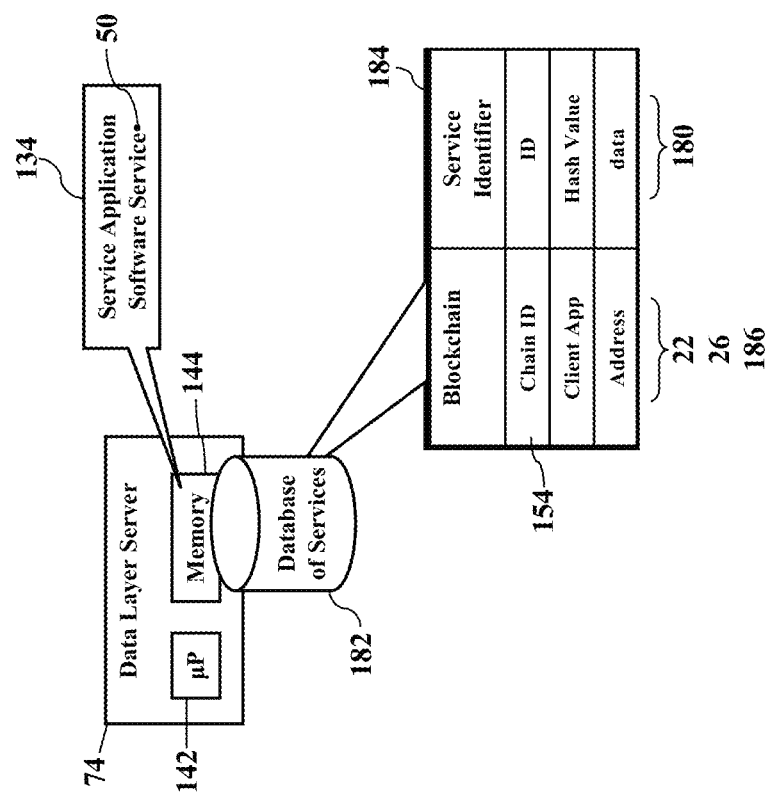

FIGS. 18-19 illustrate a service warehouse, according to exemplary embodiments. Here the data layer server 74 may operate or function as a service clearinghouse that organizes and/or manages multiple different software services 50 requested from client blockchains. As most readers are thought familiar with mobile computing, FIG. 18 again illustrates Mary's smartphone 96 generating her personal, private blockchain 90. When the mobile application 100 requires or encounters the software service 50, the mobile application 100 instructs the smartphone 96 (e.g., its processor and memory device, not shown for simplicity) to generate and send the service request 54 (via the communications network 120 illustrated in FIGS. 9-11). When the data layer server 74 receives the service request 54, the service application 134 may cause the data layer server 74 to inspect the service request 54 for a service identifier 180. The service identifier 180 may be any alphanumeric combination, hash value, or other data/information that uniquely identifies the requested software service 50.

Exemplary embodiments may consult an electronic database 182 of services. Because the data layer server 74 may manage many different software services 50, the electronic database 182 of services may be implemented to identify and/or perform the requested software service 50. FIG. 18 illustrates the data layer server 74 locally storing the database 182 of services, but the database 182 of services may be remotely stored and accessed via the communications network 120 (illustrated in FIGS. 9-11). Regardless, the data layer server 74 may query the database 182 of services for a query parameter and identify the corresponding software service 50.

FIG. 19 illustrates the electronic database 182 of services. Here the database 182 of services may define assignments between blockchains 186 and their corresponding service identifier 180. While the database 182 of services may have any logical structure, FIG. 19 illustrates the database 182 of services as a table 184 that maps, converts, or translates the service identifier 180 to its corresponding blockchain 186. As a simple example, suppose the database 182 of services configured with entries that relate the service identifier 180 to its corresponding chain ID 154. The service application 134 may instruct the data layer server 74 to query for the service identifier 180 and identify and/or retrieve the chain ID 154, a client application, a network or service address, or other indicator assigned to the corresponding service identifier 180. The database 182 of services may optionally contain entries that relate hashed values of the entries. While FIG. 19 only illustrates a few entries, in practice the database 182 of services may have many entries (perhaps hundreds or thousands) detailing a rich repository selection of software services 50. Regardless, once the blockchain 186 is identified, the service application 134 may direct or assign the service request 54 to the blockchain 186 for processing (as above explained).

Figure 20:
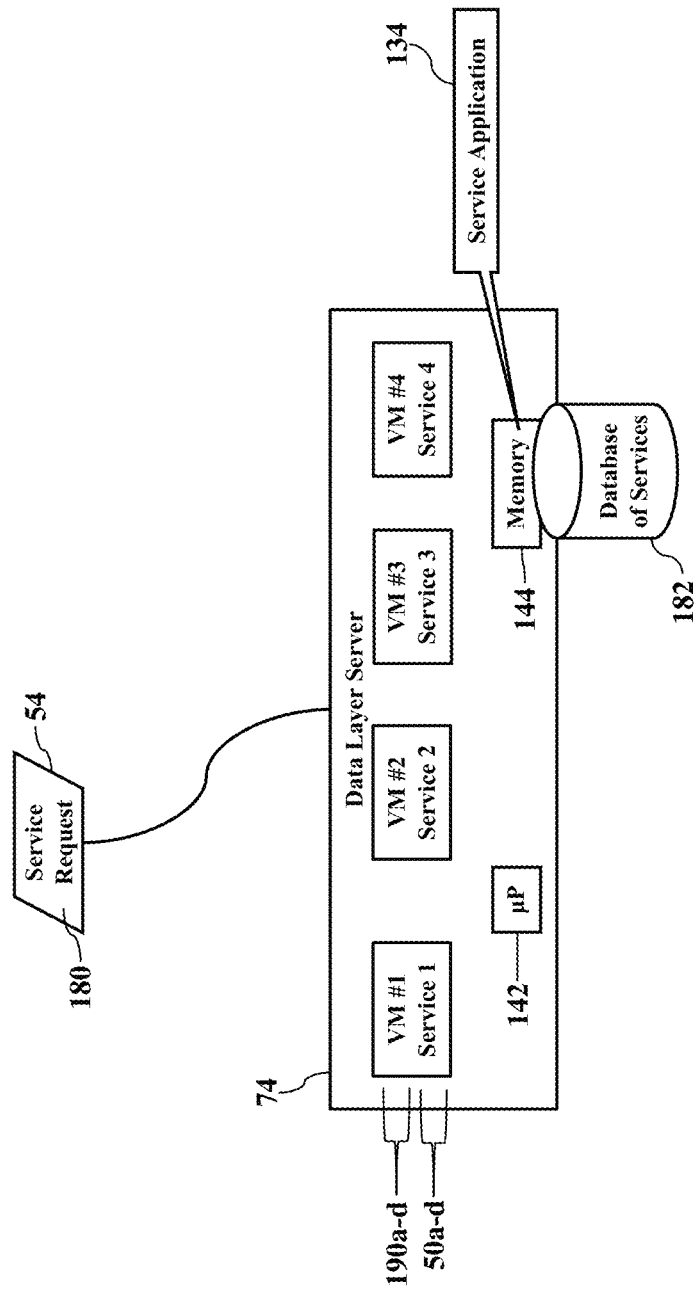
FIGS. 20-21 illustrate a virtual computing environment, according to exemplary embodiments.
Figure 21:
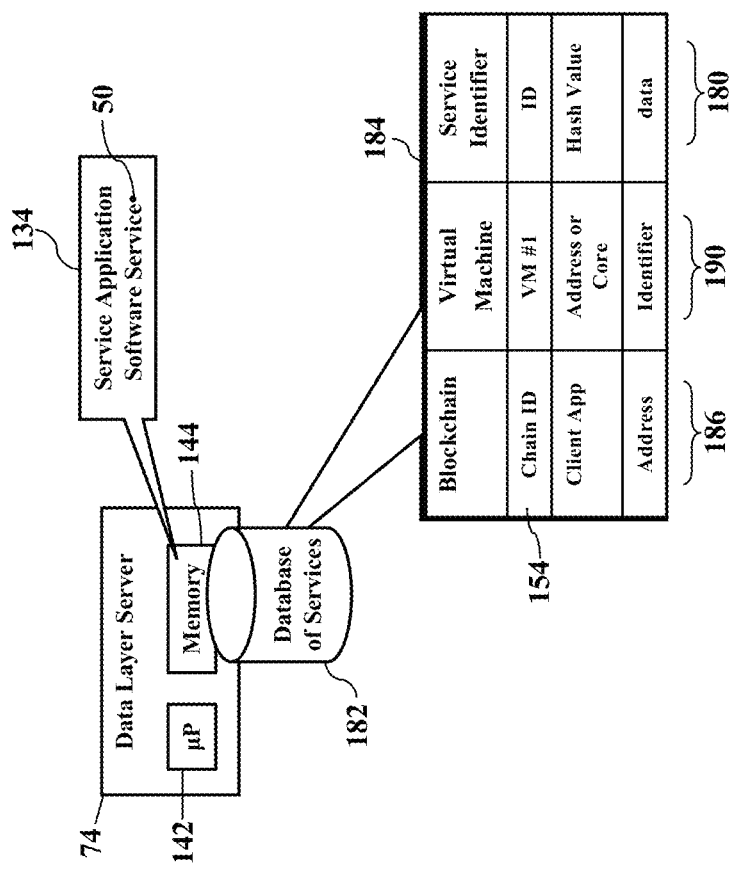

FIGS. 20-21 illustrate a virtual computing environment, according to exemplary embodiments. Here the data layer server 74 may implement different virtual machines 190, with each virtual machine 190 implementing a software service 50. The data layer server 74 may provide virtual computing and/or virtual hardware resources to client devices, thus lending or sharing its hardware, computing, and programming resources. The data layer server 74 thus operates or functions as a virtual, remote resource for providing the software services 50. While FIG. 20 only illustrates four (4) virtual machines 190*a-d*, the number or instantiations may be several or even many, depending on complexity and resources. Moreover, as a further simplification, assume that each virtual machine 190*a-d* provides a different corresponding software service 50*a-d*. So, when the data layer server 74 receives the service request 54, the service application 134 may cause the data layer server 74 to inspect the service request 54 for the service identifier 180 and consult the electronic database 182 of services.

FIG. 21 further illustrates the database 182 of services. Here the database 182 of services may specify the virtual machine 190 that performs or executes the software service 50. The database 182 of services may thus be preconfigured or preloaded with entries that assign or associate each virtual machine 190 to its corresponding service identifier 180. The service application 134 queries for the service identifier 180 to identify the corresponding virtual machine 190. Exemplary embodiments may thus determine whether the service identifier 180 matches or satisfies any of the entries specified by the database 182 of services. FIG. 21 illustrates entries that map the service identifier 180 to its corresponding virtual machine 190 (e.g., an address, processor core, identifier, or other indicator), the chain ID 154, and other tabular information. Once the virtual machine 190 is identified, the service application 134 may direct or assign the service request 54 to the corresponding blockchain 186 for processing (as above explained).

Figure 22:
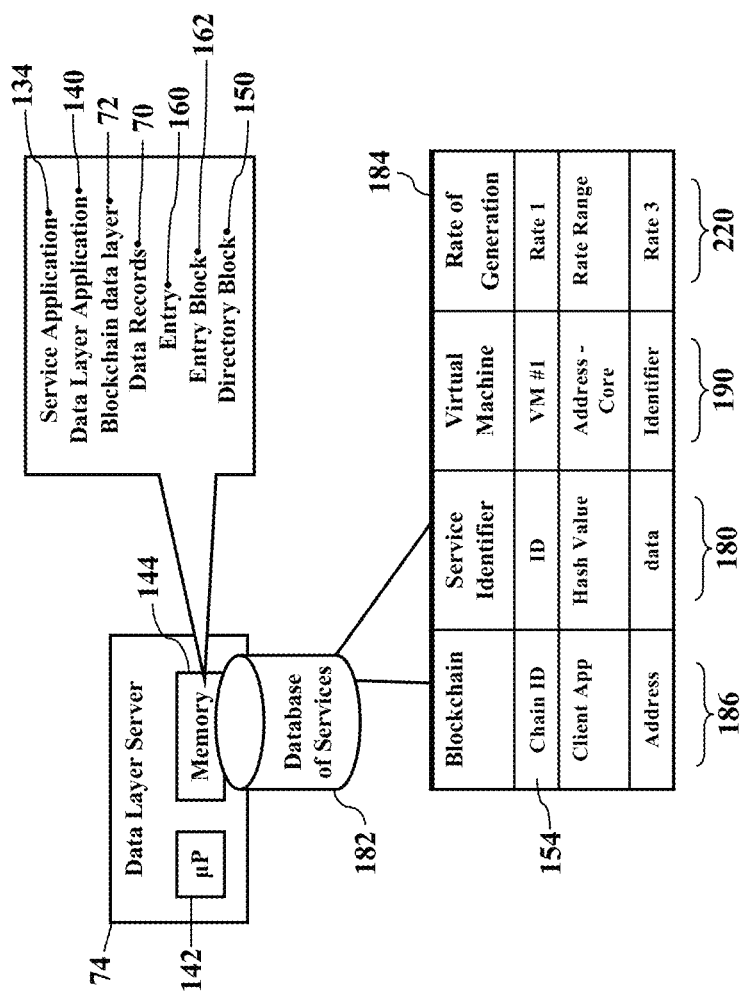
FIG. 22 illustrates allocations based on the blockchain data layer, according to exemplary embodiments.

FIG. 22 illustrates allocations based on the blockchain data layer 72, according to exemplary embodiments. As this disclosure previously explained, exemplary embodiments may generate the data records 70 representing the blockchain data layer 72 (such as the entries 160, entry blocks 162, and/or the directory blocks 150 explained with reference to FIGS. 13-15). Exemplary embodiments may thus assign the blockchain (e.g., reference numerals 24, 28, 78, 90, 112, and/or 186 above explained) and/or the virtual machine 190 that executes the software service 50, based on the number of the entries 160, the entry blocks 162, and/or the directory blocks 150 generated within the blockchain data layer 72. For example, as the data records 70 are generated, the data layer server 74 may determine a rate 200 of generation. That is, as the data records 70 are generated when or while providing the software service 50, exemplary embodiments may sum or count the entries 160, the entry blocks 162, and/or the directory blocks 150 that are generated over time (such as per second, per minute, or other interval). The service application 134 and/or the data layer application 140, for example, calls or initializes a counter having an initial value (such as zero). At an initial time, the counter commences or starts counting or summing the number of the entries 160, entry blocks 162, and/or the directory blocks 150 (generated within the blockchain data layer 72) that are commonly associated with or reference the software service 50, the service request 54, and/or the service result 56 (perhaps according to the chain ID 154, the virtual machine 190, and/or the cryptocoinage 62 and 64 illustrated in FIG. 4). The counter stops counting or incrementing at a final time and exemplary embodiments determine or read the final value or count. Exemplary embodiments may then calculate the rate 220 of generation as the sum or count over time and consult or query the electronic database 182 of services for the rate 220 of generation. The electronic database 182 of services may thus define entries that map or associate different rates 220 of generation and/or ranges to their corresponding software services 50 (such as the service identifier 180), blockchains 186, and/or virtual machines 190. If the database 182 of services has an entry that matches or satisfies the rate 220 of generation, exemplary embodiments identify the corresponding software service 50, blockchain 186, and/or virtual machine 190.

The rate 220 of generation may thus be a feedback mechanism. As the software services 50 are requested, the rate 220 of generation of the data records 70 may determine the blockchain (e.g., reference numerals 24, 28, 78, 90, 112, and/or 186 above explained) and/or the virtual machine 190 assigned adequate capacity or bandwidth. One of the blockchains (e.g., reference numerals 24, 28, 78, 90, 112, and/or 186 above explained) and/or virtual machines 190, for example, may be reserved for software services 50 having a heavy, disproportionate, or abnormally large rate 220 of generation. Another of the blockchains and/or virtual machines 190 may be reserved for software services 50 having a medium, intermediate, or historically average rate 220 of generation. Another blockchain and/or virtual machine 190 may be reserved for the software services 50 having a light, low, or historically below average rate 220 of generation. The rate 220 of generation may thus be a gauge or measure of which blockchain, software service 50, and/or virtual machine 190 is assigned the resources.

Figure 23:
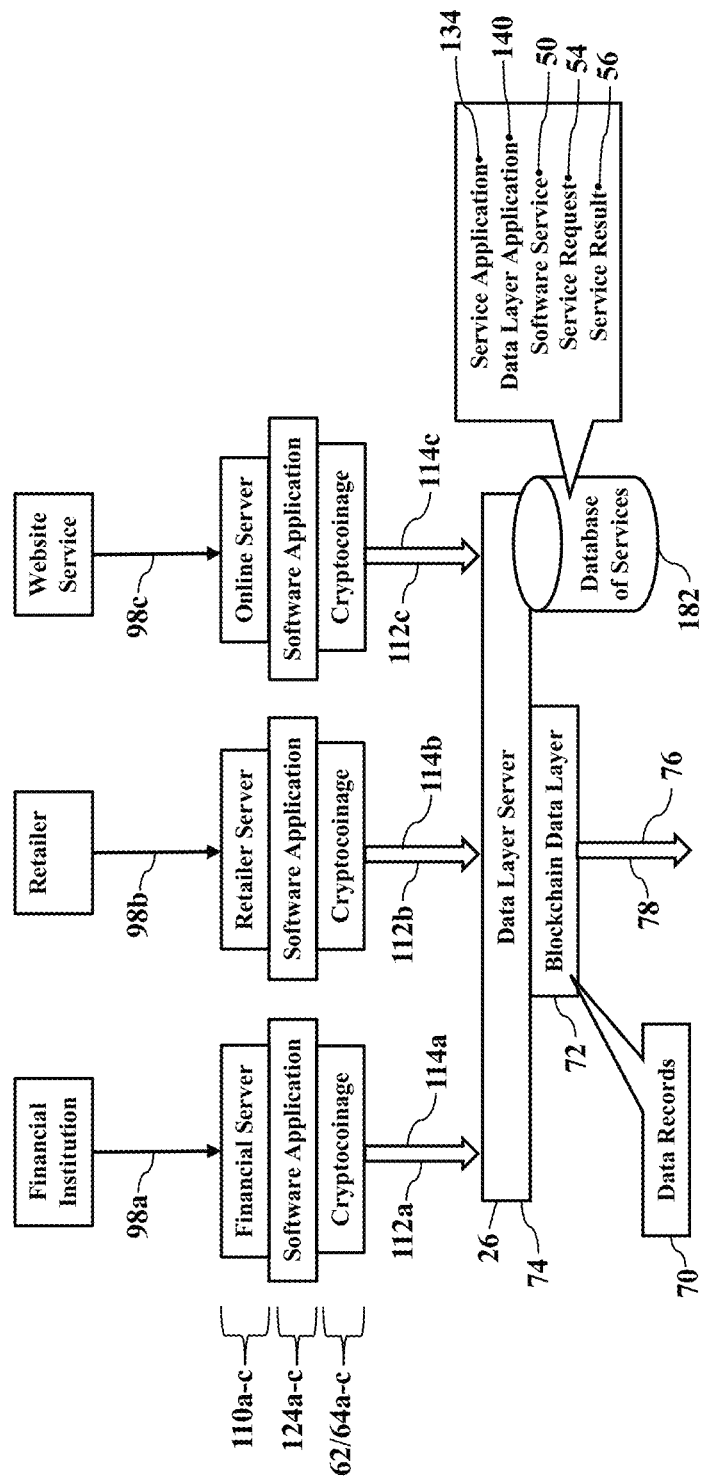
FIG. 23 illustrates a service environment, according to exemplary embodiments.

FIG. 23 illustrates a service environment, according to exemplary embodiments. Here exemplary embodiments may provide many different software services 50 to many different blockchains 24. Here the data layer server 74, for example, provides or manages the software services 50 while also generating the blockchain data layer 72 as still another service (such as the validation service 80 illustrated in FIGS. 5-6). The data layer server 74 may thus acts as a subcontractor or service provider, perhaps in a subscription or other compensation scheme. The financial server 110a may thus send or forward its private blockchain 112a (generated from its private data 98a) to the data layer server 74 for application or execution of any software service 50 (perhaps invoking the database 182 of services, as above explained). The data layer server 74 may generate the data records 70 of the blockchain data layer 72 that document the service result 56. Moreover, the data layer server 74 may publically publish the cryptographic proof 76 within the public blockchain 78, thus further documenting immutable evidence of the service result 56. The financial server 110a may also generate blocks 114a of data within the private blockchain 112a that also document the service request 54, the service result 56, and/or the software service 50. The financial server 110a may then pay or reward the data layer server 74 in exchange for the software service 50 and/or the data records 70 in the blockchain data layer 72 (such as granting its crytpocoinage 62\64).

The data layer server 74 may serve other blockchains. The retailer server 110b may send or forward its private blockchain 112b (generated from its private data 98b) to the data layer server 74 for application or execution of any software service 50. The online server 110c may also send or forward its private blockchain 112c (generated from its private data 98c) to the data layer server 74 for application or execution of any software service 50. The data layer server 74 may generate the data records 70 of the blockchain data layer 72 that document each service result 56, and the data layer server 74 may publically publish each cryptographic proof 76 within the public blockchain 78, thus further documenting immutable evidence of each service result 56. The retailer server 110b and the online server 110c may also generate their respective blocks 114b-c of data within their private blockchains 112b-c that also document each service request 54, service result 56, and/or software service 50. The retailer server 110b and the online server 110c may then pay or reward the data layer server 74 via their respective crytpocoinage 62\64b-c.

Exemplary embodiments thus describe elegant solutions. Blockchains may import data and export data in desired formats. Blockchains may offer and advertise software services 50, and blockchains may specialize in different software services and/or functions that perform or accomplish particular tasks. A marketplace may thus develop for vendors of different software services 50, perhaps accessible using a vendor-specific or service-specific software application that is downloaded or accessed via a web interface. Moreover, exemplary embodiments allow individual users and other private entities to create their own private blockchains using their private data 98 and restrict its distribution, if desired. Cryptographic publication provides a public witness via the anchor(s) 82 to the public blockchain 78. Exemplary embodiments thus provide importation and exportation schemes for hybrid two-way blockchain interactions and two-way ledgering for improved record keeping.

Figure 24:
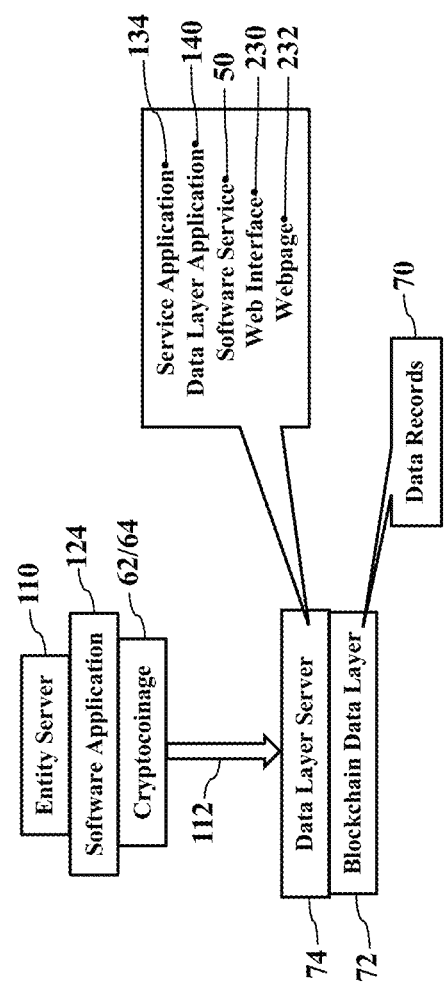
FIGS. 24-25 illustrate web access, according to exemplary embodiments.
Figure 25:
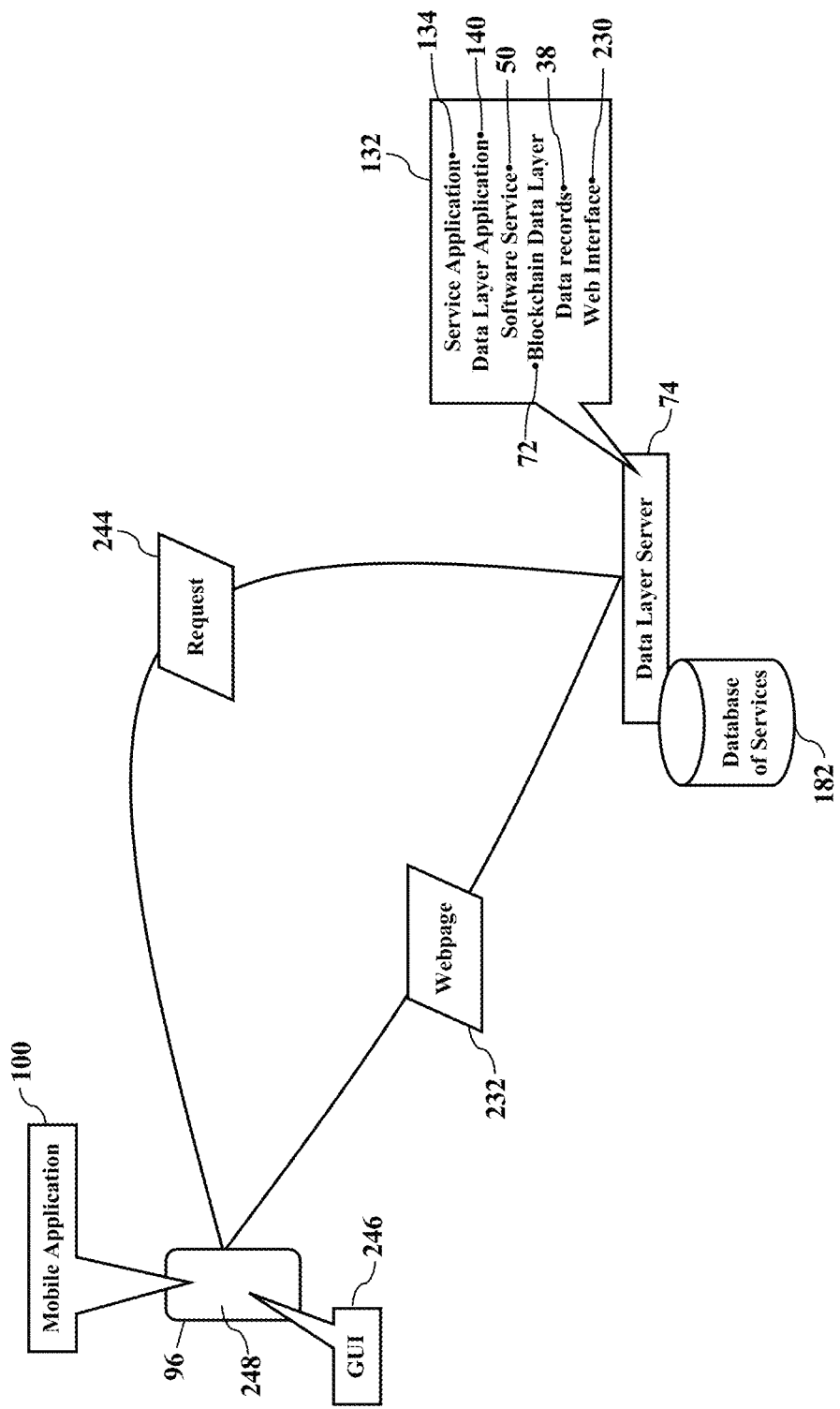

FIGS. 24-25 illustrate web access, according to exemplary embodiments. Here exemplary embodiments may be accessed and configured via the communications network 120 (such as the Internet, as illustrated with reference to FIGS. 9-11). FIG. 24 thus illustrates the service application 134 and/or the data layer application 140 as a software-as-a-service offered by the secure data layer server 74. A user may access the service application 134 and/or the data layer application 140 to define the various parameters governing the software service 50. While exemplary embodiments may have any access mechanism, FIG. 24 illustrates a web interface 230. That is, the service application 134 and/or the data layer application 140 may be accessed via a webpage 232. The webpage 232 prompts the user to input or to select one or more parameters governing the software service 50, the service application 134, and/or the data layer application 140.

FIG. 25 further illustrates the web interface 230. Again, as most readers are thought familiar with mobile computing, FIG. 25 again illustrates Mary's smartphone 96 executing the mobile application 100 (e.g., via its processor and memory device, not shown for simplicity). If the smartphone 96 correctly sends authentication credentials, then the smartphone 96 may utilize the web interface 230 to access the data layer server 74, the blockchain data layer 72, the service application 134, the data layer application 140, and/or the database 182 of services. The smartphone 96 executes a web browser and/or a mobile application to send a request 244 specifying an address or domain name associated with or representing the data layer server 74, the service application 134, and/or the data layer application 140. The web interface 230 to the data layer server 74 thus sends the webpage 232 as a response, and the user's smartphone 96 downloads the webpage 232. The smartphone 96 has a processor and memory device (not shown for simplicity) that causes a display of the webpage 232 as a graphical user interface (or "GUI") 246 on its display device 248. The GUI 246 may generate one or more prompts or fields for specifying the parameters defining the data layer server 74, the blockchain data layer 72, the service application 134, the data layer application 140, and/or the database 182 of services. As one example, the webpage 232 may have prompts or fields for specifying the entries in the electronic database 182 of services. Once the parameters or entries are specified, the software service 50 may commence operation.

Figure 26:
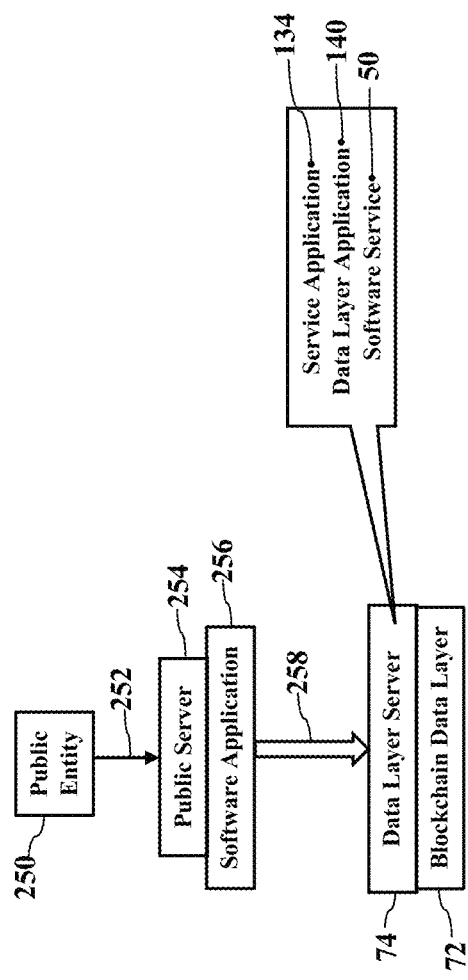
FIG. 26 illustrates a public entity, according to exemplary embodiments.

FIG. 26 illustrates a public entity 250, according to exemplary embodiments. Here exemplary embodiments may provide the software service 50 to any city, state, or federal governmental agency. Indeed, the public entity 250 may also be a contractor, non-governmental organization, or other actor that acts on behalf of the governmental agency. The public entity 250 operates its corresponding public server 254 and applies its software application 256 to its public data 252 to generate its governmental blockchain 258. The data layer server 74 receives the governmental blockchain 258 and generates the blockchain data layer 72. The data layer server 74 may also execute the service application 134 and/or the data layer application 140 to provide the software service 50, as this disclosure explains.

Figure 27:
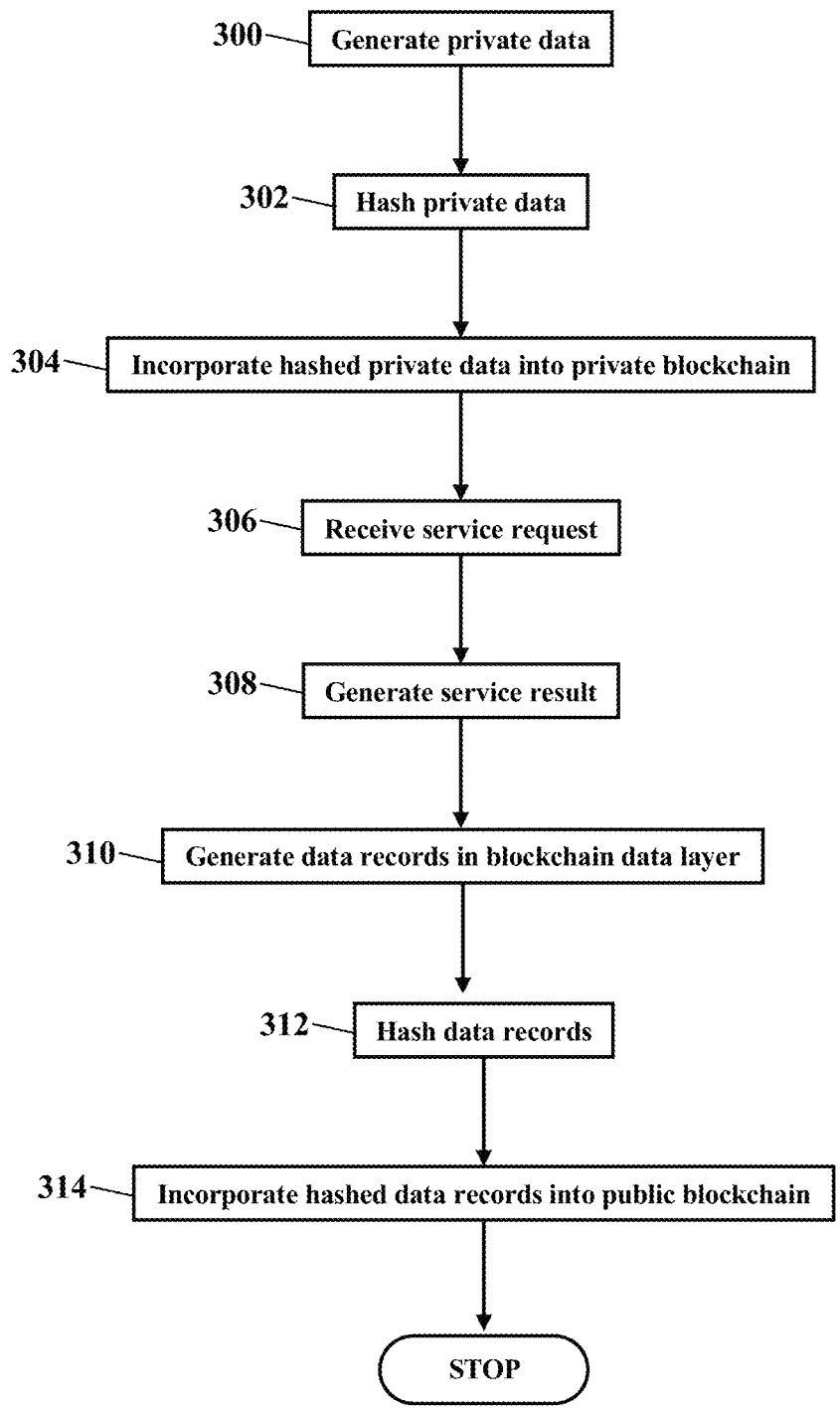
FIG. 27 is a flowchart illustrating a method or algorithm for service processing, according to exemplary embodiments.

FIG. 27 is a flowchart illustrating a method or algorithm for service processing, according to exemplary embodiments. The electronic private data 98 is generated (Block 300), hashed (Block 302), and incorporated into the private blockchain 112 (Block 304). The service request 54 is received by the data layer server 74 (Block 306) and the service result 56 is generated (Block 308). The data records 70 in the blockchain data layer 72 are generated (Block 310). The data records 70 in the blockchain data layer 72 may be hashed (Block 312) and incorporated into the public blockchain 78 (Block 314), thus documenting the service request 54, the service result 56, and the software service 50.

Figure 28:
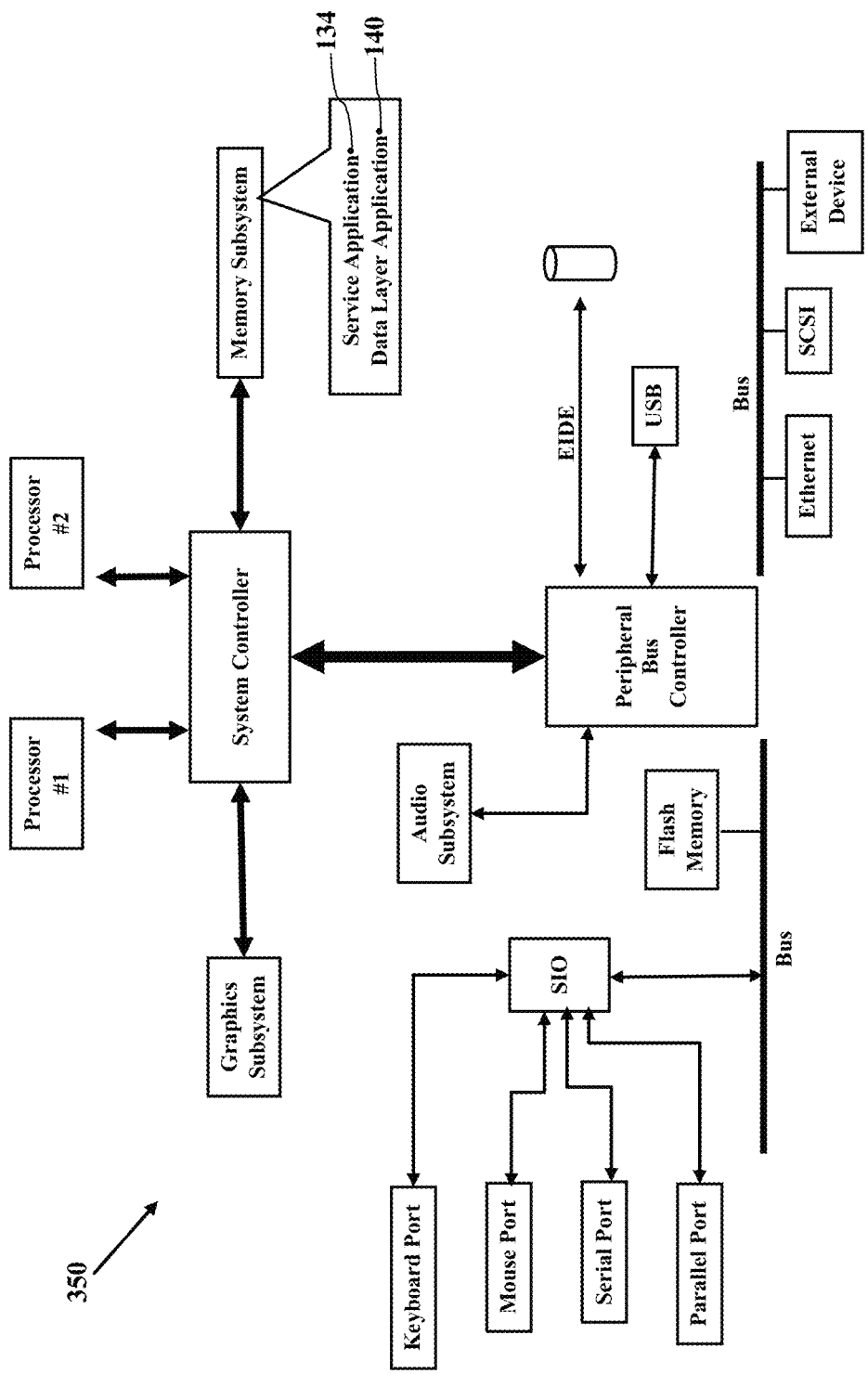
FIGS. 28-29 depict still more operating environments for additional aspects of the exemplary embodiments.

FIG. 28 is a schematic illustrating still more exemplary embodiments. FIG. 28 is a more detailed diagram illustrating a processor-controlled device 350. As earlier paragraphs explained, the service application 134 and/or the data layer application 140 may partially or entirely operate in any mobile or stationary processor-controlled device. FIG. 28, then, illustrates the service application 134 and/or the data layer application 140 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 29:
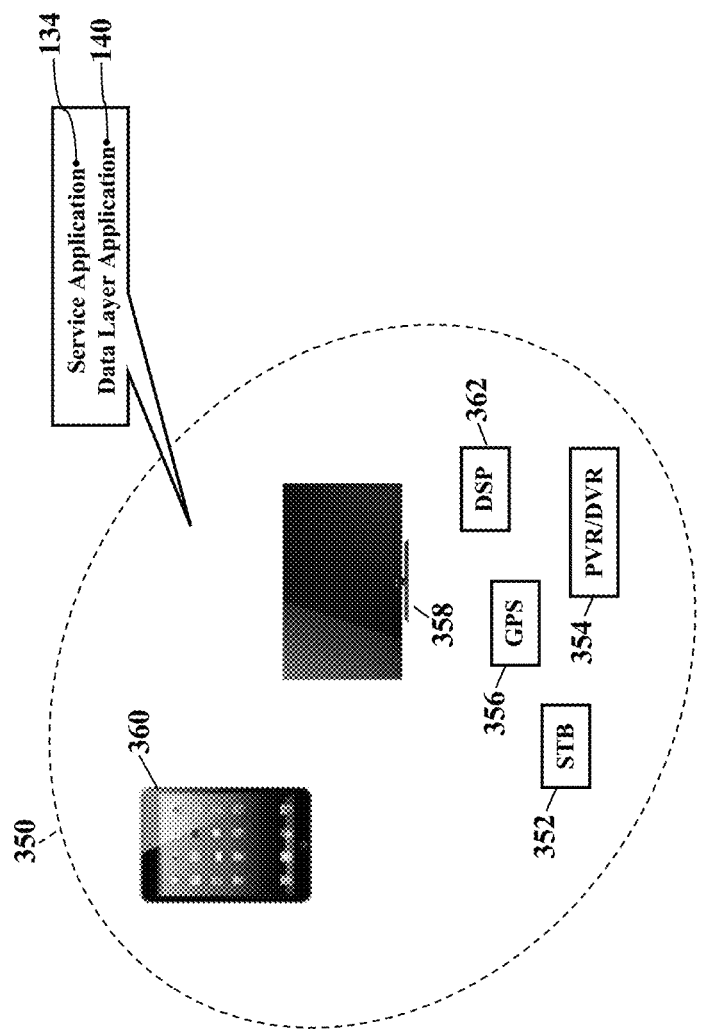

FIG. 29 depicts other possible operating environments for additional aspects of the exemplary embodiments. FIG. 29 illustrates the service application 134 and/or the data layer application 140 operating within various other processor-controlled devices 350. FIG. 29, for example, illustrates that the entity's private software application 126 and/or the data layer application 140 may entirely or partially operate within a set-top box ("STB") (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for service processing in blockchain environments, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
receiving, by a blockchain, a service request from a different blockchain, the service request specifying a service identifier;
querying, by the blockchain, an electronic database for the service identifier specified by the service request, the electronic database electronically associating service identifiers to different software services including the service identifier specified by the service request;

identifying, by the blockchain, a software service of the different software services that is electronically associated by the electronic database to the service identifier specified by the service request;

importing, by the blockchain, a block of data chained within the different blockchain;

generating, by the blockchain, a service result associated with the software service by executing a service application based on the block of data imported from the different blockchain; and sending, by the blockchain, the service result via the Internet to the different blockchain as a response to the service request.

2. The method of claim 1, further comprising formatting the block of data.

3. The method of claim 1, further comprising formatting the service result generated by the service application.

4. The method of claim 1, further comprising exporting the block of data.

5. The method of claim 1, further comprising transacting a cryptocoinage in response to the service result associated with the software service.

6. The method of claim 1, further comprising generating a cryptographic proof based on the service result associated with the software service.

7. The method of claim 6, further comprising integrating the cryptographic proof in a public blockchain to document the service result associated with the software service.

8. A system, comprising:

a hardware processor; and a memory device, the memory device storing instructions, the instructions when executed causing the hardware processor to perform operations, the operations comprising:

receiving a service request sent from a first blockchain providing a first service, the service request specifying a service identifier associated with a second software service provided by a second blockchain that is different from the first service provided by the first blockchain;

importing a block of data from the first blockchain providing the first service to the second blockchain providing the second service;

generating a service result associated with the second software service by executing a service application based on the block of data imported from the first blockchain providing the first service;

identifying a chain identifier by querying an electronic database for the service identifier specified by the service request received from the first blockchain, the electronic database electronically associating service identifiers to chain identifiers including the chain identifier that is electronically associated to the service identifier specified by the service request received from the first blockchain;

generating a data record in a blockchain data layer that documents the service result in an association with the chain identifier; and sending the service result associated with the second software service via the Internet to the first blockchain as a response to the service request.

9. The system of claim 8, wherein the operations further comprise associating the block of data to the chain identifier.

10. The system of claim 8, wherein the operations further comprise formatting the service result generated by the service application.

11. The system of claim 8, wherein the operations further comprise exporting the block of data.

12. The system of claim 8, wherein the operations further comprise transacting a cryptocoinage in response to the service result.

13. The system of claim 8, wherein the operations further comprise generating a cryptographic proof based on the service result.

14. The system of claim 13, wherein the operations further comprise integrating the cryptographic proof in a public blockchain to document the service result.

15. A memory device storing instructions that when executed cause a hardware processor to perform operations, the operations comprising:

receiving a service request sent from a first blockchain providing a first service, the service request specifying a service identifier associated with a second service different from the first service;

importing a block of data from the first blockchain providing the first service;

querying an electronic database for the service identifier associated with the second service, the electronic database electronically associating virtual machines providing services and chain identifiers to service identifiers including the service identifier associated with the second service specified by the service request sent from the first blockchain;

identifying a chain identifier of the chain identifiers in the electronic database that is electronically associated to the service identifier specified by the service request sent from the first blockchain;

identifying a virtual machine of the virtual machines that provides the second service, the virtual machine electronically associated by the electronic database to the chain identifier;

sending the block of data imported from the first blockchain providing the first service to the virtual machine identified by the electronic database that provides the second service;

receiving a service result generated by the virtual machine that provides the second service based on the block of data imported from the first blockchain;

generating a data record in a blockchain data layer that links the service result to the chain identifier and to the virtual machine that provides the second service; and sending the service result via the Internet to the first blockchain as a response to the service request.

16. The memory device of claim 15, wherein the operations further comprise executing the virtual machine that provides the second service.

17. The memory device of claim 15, wherein the operations further comprise assigning the block of data to the virtual machine.

18. The memory device of claim 15, wherein the operations further comprise generating a cryptographic proof by cryptographically hashing the service result.

19. The memory device of claim 18, wherein the operations further comprise integrating the cryptographic proof in a public blockchain to document the service result.

20. The memory device of claim 15, wherein the operations further comprise exporting the block of data chained within the first blockchain.

* * * * *